United States Patent
Ogawa et al.

(10) Patent No.: US 12,034,776 B2
(45) Date of Patent: *Jul. 9, 2024

(54) COMMUNICATION METHOD, COMMUNICATION APPARATUS, AND COMMUNICATION SYSTEM

(71) Applicant: Nippon Telegraph and Telephone Corporation, Tokyo (JP)

(72) Inventors: Muneaki Ogawa, Musashino (JP); Kenjiro Arai, Musashino (JP); Kenichi Hiragi, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/142,183

(22) Filed: May 2, 2023

(65) Prior Publication Data

US 2023/0269280 A1 Aug. 24, 2023

Related U.S. Application Data

(62) Division of application No. 16/923,358, filed on Jul. 8, 2020, now abandoned, which is a division of (Continued)

(30) Foreign Application Priority Data

Jul. 14, 2016 (JP) ................................ 2016-139714

(51) Int. Cl.
*H04L 65/1016* (2022.01)
*H04L 65/1046* (2022.01)
(Continued)

(52) U.S. Cl.
CPC ...... *H04L 65/1016* (2013.01); *H04L 65/1046* (2013.01); *H04L 65/1069* (2013.01);
(Continued)

(58) Field of Classification Search
None
See application file for complete search history.

(56) References Cited

U.S. PATENT DOCUMENTS 6,359,902 B1 3/2002 Putzolu
7,512,118 B1 3/2009 Stephens
(Continued)

FOREIGN PATENT DOCUMENTS

EP 1069738 A1 1/2001
JP 2010512106 A 4/2010
(Continued)

OTHER PUBLICATIONS

"IP Multimedia Call Control Protocol Based on Session Initiation Protocol (SIP) and Session Description Protocol (SDP)", 3GPP TS 24.229 V14.0.1, Jun. 2016, 932 pages.
(Continued)

*Primary Examiner* — Gregory B Sefcheck
(74) *Attorney, Agent, or Firm* — Kilpatrick Townsend & Stockton LLP

(57) ABSTRACT

A network that is to execute transcoding is fixed. IMS networks set an information element that requests either of the IMS networks to execute transcoding into the SDP, and use that information element to select the IMS network that is to execute transcoding between the IMS networks. Then, the selected IMS network executes transcoding of media data.

3 Claims, 15 Drawing Sheets

Related U.S. Application Data application No. 16/309,612, filed as application No. PCT/JP2017/025713 on Jul. 14, 2017, now Pat. No. 11,012,478.

(51) Int. Cl.

| | | |
|---|---|---|
| *H04L 65/1069* | (2022.01) | |
| *H04L 65/1104* | (2022.01) | |
| *H04L 65/75* | (2022.01) | |
| *H04M 11/00* | (2006.01) | |
| *H04M 11/06* | (2006.01) | |

(52) U.S. Cl.
CPC ........ *H04L 65/1104* (2022.05); *H04L 65/765* (2022.05); *H04M 11/00* (2013.01); *H04M 11/066* (2013.01)

(56) References Cited

U.S. PATENT DOCUMENTS

| | | | |
|---|---|---|---|
| 7,617,319 | B2 | 11/2009 | Burks et al. |
| 7,751,359 | B1 | 7/2010 | Bienn et al. |
| 7,940,793 | B2 | 5/2011 | Zilbershtein et al. |
| 7,944,862 | B2 | 5/2011 | Taylor et al. |
| 8,059,656 | B1 | 11/2011 | Telikepalli et al. |
| 8,139,541 | B2 | 3/2012 | Ejzak et al. |
| 8,199,727 | B1 | 6/2012 | Bienn et al. |
| 8,213,365 | B2 | 7/2012 | Bienn et al. |
| 8,249,076 | B1 | 8/2012 | Bertone et al. |
| 8,289,368 | B2 | 10/2012 | Gopal et al. |
| 8,472,453 | B2 | 6/2013 | Bangalore et al. |
| 8,560,729 | B2 | 10/2013 | Jabri et al. |
| 8,595,018 | B2 | 11/2013 | Kampmann et al. |
| 8,670,770 | B2 | 3/2014 | Fitzgerald et al. |
| 8,776,161 | B2 | 7/2014 | Gazier et al. |
| 8,843,992 | B2 | 9/2014 | Fernandez Alonso et al. |
| 8,893,204 | B2 | 11/2014 | Levin et al. |
| 9,143,534 | B1* | 9/2015 | Kelliher .............. H04L 65/1069 |
| 9,282,131 | B2 | 3/2016 | Hosur et al. |
| 9,509,725 | B2 | 11/2016 | Belling et al. |
| 9,629,131 | B2 | 4/2017 | Ozgur |
| 9,876,838 | B2 | 1/2018 | Li et al. |
| 9,961,116 | B2 | 5/2018 | Prajapat |
| 10,075,479 | B2 | 9/2018 | Belling et al. |
| 10,129,300 | B2 | 11/2018 | Sharma et al. |
| 10,148,703 | B2 | 12/2018 | Mufti et al. |
| 10,412,136 | B2 | 9/2019 | Gonzalez De Langarica et al. |
| 10,594,744 | B2 | 3/2020 | Hori |
| 10,848,602 | B2 | 11/2020 | Frankkila et al. |
| 11,012,478 | B2 | 5/2021 | Ogawa et al. |
| 2004/0037312 | A1 | 2/2004 | Spear |
| 2004/0240399 | A1 | 12/2004 | Corrao et al. |
| 2005/0105511 | A1 | 5/2005 | Poikselka |
| 2006/0153102 | A1 | 7/2006 | Kuure et al. |
| 2007/0047707 | A1 | 3/2007 | Mayer et al. |
| 2007/0153766 | A1 | 7/2007 | Bienn et al. |
| 2008/0025414 | A1 | 1/2008 | Kim et al. |
| 2008/0081648 | A1* | 4/2008 | Kang .................. H04M 7/0072 455/500 |
| 2009/0183211 | A1 | 7/2009 | Yan et al. |
| 2010/0134590 | A1* | 6/2010 | Lindstrom .......... H04L 65/1016 370/352 |
| 2010/0150141 | A1 | 6/2010 | Lee |
| 2011/0136483 | A1* | 6/2011 | Dwight ................. H04W 28/18 455/422.1 |
| 2012/0185600 | A1* | 7/2012 | Belling ................. H04L 45/645 709/227 |
| 2012/0219130 | A1 | 8/2012 | Zhu et al. |
| 2013/0232273 | A1* | 9/2013 | Lawn .................... H04L 67/141 709/228 |
| 2013/0246052 | A1 | 9/2013 | Tanaka et al. |
| 2014/0101328 | A1 | 4/2014 | Coulombe |
| 2014/0328323 | A1 | 11/2014 | Zhang et al. |
| 2015/0045041 | A1 | 2/2015 | Polisetty et al. |
| 2016/0021163 | A1* | 1/2016 | Lee ........................ H04W 4/18 370/352 |
| 2016/0149984 | A1* | 5/2016 | Prajapat .............. H04L 65/1069 370/329 |
| 2018/0014168 | A1 | 1/2018 | Lau et al. |

FOREIGN PATENT DOCUMENTS

| | | | |
|---|---|---|---|
| JP | 2010273103 | A | 12/2010 |
| JP | 2011166453 | A | 8/2011 |
| JP | 2012209638 | A | 10/2012 |
| JP | 2013012856 | A | 1/2013 |

OTHER PUBLICATIONS

"IP Multimedia Subsystem (IMS)", 3GPP TS 23.228 V14.0.0, Jun. 2016, 40 pages.
U.S. Appl. No. 16/309,612, "Final Office Action", Nov. 13, 2020, 7 pages.
U.S. Appl. No. 16/309,612, "Non-Final Office Action", Aug. 7, 2020, 8 pages.
U.S. Appl. No. 16/309,612, "Notice of Allowance", Mar. 19, 2021, 9 pages.
U.S. Appl. No. 16/923,358, "Final Office Action", Feb. 2, 2023, 21 pages.
U.S. Appl. No. 16/923,358, "Final Office Action", May 12, 2022, 15 pages.
U.S. Appl. No. 16/923,358, "Non-Final Office Action", Feb. 4, 2022, 11 pages.
U.S. Appl. No. 16/923,358, "Non-Final Office Action", Oct. 28, 2022, 16 pages.
Handley, et al., "SDP: Session Description Protocol", Network Working Group, Apr. 1998, 42 pages.
JP2018-527680, "Office Action", Sep. 17, 2019, 6 pages.
PCT/JP2017/025713, "International Preliminary Report on Patentability", Jan. 24, 2019, 8 pages.
PCT/JP2017/025713, "International Search Report and Written Opinion", Oct. 3, 2017, 10 pages.
PCT/JP2017/025713, "Written Opinion", Oct. 3, 2017, 4 pages.
Rosenberg, et al., "An Offer/Answer Model With Tile Session Description Protocol (SDP)", Network Working Group, Jun. 2002, 25 pages.
Rosenberg, et al., "SIP; Session Initiation Protocol"; Network Working Group, Available Online At: https://www.rfc-editor.org/rfc/rfc3261.txt, Jun. 2002, 269 pages.
Schulzrinne, et al., "RTP: A Transport Protocol for Real-Time Applications", Network Working Group, Request for Comments: 3550, Jul. 2003, 104 pages.
U.S. Appl. No. 18/142,143, Non-Final Office Action mailed on Dec. 8, 2023, 16 pages.
U.S. Appl. No. 18/204,613, Notice of Allowance mailed on Jan. 31, 2024, 11 pages.
Japanese Application No. JP2019-208007, Notice of Decision to Grant mailed on Aug. 25, 2020, 5 pages.

* cited by examiner

COMMUNICATION METHOD, COMMUNICATION APPARATUS, AND COMMUNICATION SYSTEM

This application is a divisional of Ser. No. 16/923,358 filed Jul. 8, 2020, which is a divisional of U.S. Ser. No. 16/309,612 filed Jul. 14, 2017, issued as U.S. Pat. No. 11,012,478. This application is also related to co-pending application U.S. Ser. No. 18/142,143 filed concurrently herewith and to U.S. Ser. No. 18/204,613 filed Jun. 1, 2023, all of which are hereby incorporated by reference in their entireties for all purposes.

TECHNICAL FIELD

The present invention relates to a call control technique using the SIP/SDP. Particularly, the present invention relates to SIP application software mounted in a Session Border Controller (SBC) that controls a boundary with a different network or terminal.

BACKGROUND ART

In audio and video communication using the Session Initiation Protocol (SIP), the Session Description Protocol (SDP) in which media information on this communication is described is exchanged between an outgoing terminal and an incoming terminal or between SIP servers in a network, media conditions of the audio and video (media type, codec, packetization period, and the like) are then settled by negotiation, and thereafter actual transmission and reception of audio packets with the Real-time Transport Protocol (RTP) are performed.

Particularly, negotiation on the media information (SDP negotiation) is performed such that the outgoing-side terminal describes the media (such as audio and video) desired to be used for communication and various parameters of the media (codec, packetization period, and the like) into SDP offer, and then the incoming-side terminal chooses media conditions to be used for the communication from the media conditions described in the SDP offer, describes the chosen media conditions into SDP answer, and sends back the SDP answer to the outgoing-side terminal. In this way, the conditions of the communication media to be used between the outgoing and incoming terminals are settled.

Meanwhile, in 3GPP, the IP Multimedia Subsystem (IMS) is defined as a system in which telecommunications carriers provide multimedia services including a telephone service. The IMS is a multimedia service system supporting any of access types (3G, LTE, WiFi, optical access, and so on) used by outgoing and incoming terminals such as mobile and fixed terminals. However, an IMS network including only the mobile terminal and an IMS network including only the fixed terminal may have a case where no common codec is supported by terminals in these different IMS networks.

For example, in general, the fixed terminal supports at least a G.711µ-law audio codec while the mobile terminal supports at least an AMR-NB audio codec. Thus, an IMS network of a telecommunications carrier requires a function of codec conversion to achieve intercommunication between the fixed terminal and the mobile terminal.

Note that, there is a function, generally called a transcoding function, in which an intermediate node in an IMS network executes not only the codec conversion but also rewrite processing of the SDP (such as adding or deleting of a codec) and conversion processing of media (RTP and the like) according to conditions before the SDP rewriting and after the SDP rewriting. Transcoding is usually executed using information on the codecs supported by the outgoing and incoming terminals, based on an operator policy defined by the carriers with an agreement between the carriers, the Service Level Agreement (SLA), and so on.

FIG. 7 is a diagram that illustrates a processing procedure of transcoding executed by an SBC. The Session Border Controller (SBC) is an intermediate node provided around a boundary of the IMS network and, for example, composed of an Interconnection Border Control Function (IBCF; SIP server) and a Translation Gateway (TrGW; media server). Thus, in an actual operation, the SIP server in the SBC uses H.248 to give an instruction to perform the rewrite processing on an SDP and the media conversion based on that SDP, and the media server in the SBC converts packets of the media based on that instruction.

Specifically, when receiving SDP offer, the SBC (IBCF) adds a codec that can be transcoded by the own IMS network or a terminal in the own IMS network (in this example, codec b) to a codec list set in the SDP offer. Then, when a codec in SDP answer received thereafter includes a codec in the previously received SDP offer (in this example, codec a), the SBC transmits the SDP answer as it is without executing the transcoding function (FIG. 7A).

On the other hand, when the codec in the received SDP answer does not include a codec in the previously received SDP offer (codec a), the SBC (IBCF) chooses one codec from the codecs included in the previously received SDP offer (in this example, there is only codec a) and transmits SDP answer in which that codec information is described (FIG. 7B). Thereafter, the SBC (TrGW) executes transcoding between the codec of the received SDP answer and the codec of the transmitted SDP answer (codec b<→a).

For example, when a single IMS network includes the mobile terminal and the fixed terminal, communication between the mobile terminal and the fixed terminal within the own IMS network is enabled by providing the transcoding function to a node such as an intermediate node (such as SIP server and media server) or the node nearest to the terminal (such as Proxy Call State Control Function (P-CSCF) and Media Gateway (MGW)).

In another case, when interconnecting the IMS network including only the mobile terminal and the IMS network including only the fixed terminal, communication between the mobile terminal and the fixed terminal in the different IMS networks is enabled by the IMS network of SDP offer transmitting side or the IMS network of SDP answer transmitting side executing transcoding. Processing procedures of the transcoding executed in the IMS network of SDP offer transmitting side and the IMS network of SDP answer transmitting side are respectively illustrated in FIGS. 8 and 9.

In addition, FIGS. 10 and 11 respectively illustrate, as a specific example thereof, processing procedures in a case where, when interconnecting an IMS network including the fixed terminal supporting only the G.711µ-law audio codec and an IMS network including the mobile terminal supporting only the AMR audio codec, the IMS network of SDP offer transmitting side executes transcoding between G.711µ-law and AMR and the IMS network of SDP answer transmitting side executes the same transcoding. Note that the codecs to be transcoded, SBC function provision, the SIP message in which the SDP is set, and so on are not limited to the present example.

As illustrated in FIGS. 10 and 11, in communication using the SIP as a call control signal, unless the call control is a service by the 3rd Party Call Control (3PCC) or the like, an Initial-INVITE request containing SDP offer is transmitted from the outgoing terminal, then SDP answer is set in a response (such as 18x response (x is a number) or 200 response) generated by the incoming terminal, and the communication is started upon completion of the initial SDP offer/answer. When the SDP offer transmitting side is responsible for transcoding, the IMS network of outgoing side as the SDP offer transmitting side executes the transcoding after the initial SDP offer/answer.

PRIOR ART DOCUMENT

Non-Patent Document

Non-patent document 1: "SIP: Session Initiation Protocol", RFC3261, [online], [searched on June 29, H28], <URL: https://www.ietf.org/rfc/rfc3261.txt>
Non-patent document 2: "SDP: Session Description Protocol", RFC2327, [online], [searched on June 29, H28], <URL: https://www.ietf.org/rfc/rfc2327.txt>
Non-patent document 3: "RTP: A Transport Protocol for Real-Time Applications", RFC3550, [online], [searched on June 29, H28], <URL: https://www.ietf.org/rfc/rfc3550.txt>
Non-patent document 4: "An Offer/Answer Model with the Session Description Protocol (SDP)", RFC3264, [online], [searched on June 29, H28], <URL: https://www.ietf.org/rfc/rfc3264.txt>
Non-patent document 5: "IP Multimedia Subsystem (IMS)", 3GPP TS 23.228, [online], [searched on June 29, H28], CURL: http://www.3gpp.org/DynaReport/23228.htm>
Non-patent document 6: "IP multimedia call control protocol based on Session Initiation Protocol (SIP) and Session Description Protocol (SDP)", 3GPP TS 24.229, [online], [searched on June 29, H28], <URL: http://www.3gpp.org/dynareport/24229.htm>

SUMMARY OF THE INVENTION

Problem to be Solved by the Invention

However, in an actual service, multiple times of SDP offer/answer are performed for communication involving media changing such as switching from a guidance or a video call to an audio call. Thus, there is a problem that a transcoding execution point cannot be fixed in an outgoing side network or an incoming side network like a case where, when the SDP offer is transmitted from the IMS network of incoming side, transcoding is executed in the IMS network of incoming side after the second SDP offer/answer even though transcoding is executed in the IMS network of outgoing side after the initial SDP offer/answer, as illustrated in FIG. 12. In another case, as illustrated in FIG. 13, there is a similar problem that transcoding is executed in the IMS network of outgoing side after the second SDP offer/answer even though transcoding is executed in the IMS network of incoming side after the initial SDP offer/answer.

As a specific example, FIG. 14 illustrates an example case where, when interconnecting the IMS network including the fixed terminal and the IMS network including the mobile terminal, the IMS network of the mobile terminal provides a guidance to the outgoing terminal in the IMS network of the fixed terminal before the call is established and the SDP offer transmitting side executes transcoding. In the initial SDP offer/answer, since the SDP offer is transmitted from the outgoing terminal, transcoding for the guidance media before the call establishment is executed in the IMS network of outgoing side. However, in the second SDP offer/answer, since the SDP offer is transmitted from the IMS network of incoming side, transcoding related to talking media between the outgoing and incoming terminals is executed in the IMS network of incoming side. In an opposite way, as illustrated in FIG. 15, even though the transcoding for the guidance media before call establishment is executed in the IMS network of incoming side, the transcoding for the talking media between the outgoing and incoming terminals is executed in the IMS network of outgoing side.

Here, transcoding consumes much more resources than resources required by the processing of transparently forwarding the media packets. For this reason, when functions of a call control system are desired to be designed based on the number of outgoing and incoming calls, it is desirable to fix transcoding during one call to the outgoing side or the incoming side. In addition, since it is expected that the number of required functions varies depending on transcoding, carriers each also have a demand that, in interconnection between the carriers and another carrier, transcoding of outgoing calls from the own network be executed in the own network so as to reduce access charge from the destination network.

However, with the current processing procedure of transcoding, although transcoding can be executed on either of the SDP offer transmitting side and the SDP answer transmitting side, it is impossible to fix the transcoding execution point to the outgoing side or the incoming side through 1 call.

The present invention was made in light of the above-described circumstances and has an object to fix a transcoding execution network (outgoing side or incoming side).

Means for Solving the Problem

In order to solve the above problems, a gist of a communication method according to one aspect of the invention is that, in a communication method executed between multiple communication devices, the method comprising causing a certain communication device out of the communication devices to perform: a first step of setting parameter information that requests any of the communication devices to execute transcoding into Session Description Protocol (SDP); and a second step of executing transcoding of media data by the certain communication device itself, when the parameter information set in the SDP requests the certain communication device itself.

A gist of a communication method according to one aspect of the invention is that, in the communication method, if the certain communication device requested by the parameter information is determined not to execute transcoding, the first step involves changing the parameter information to indicate an opposite one of the communication devices.

A gist of a communication method according to one aspect of the invention is that, in a communication method executed between multiple communication devices, the method comprising, when a certain communication device out of the communication devices is to execute transcoding of media data, causing the certain communication device to perform a first step of storing a codec type currently in use that is determined by Session Description Protocol (SDP) negotiation into a codec information storing unit, a second step of receiving a Session Initiation Protocol (SIP) message containing SDP offer, and a third step of transmitting the SIP message containing the SDP offer that includes a codec type currently in use in a forwarding destination.

A gist of a communication method according to one aspect of the invention is that, in the communication method, if the SDP offer in the received SIP message includes a codec type currently in use in a forwarding source, the third step involves including the codec type currently in use in the forwarding destination into the SDP offer in the SIP message to be transmitted.

A gist of a communication method according to one aspect of the invention is that, in the communication method, if the SDP offer in the received SIP message does not include a codec type currently in use in a forwarding source and if the certain communication device is capable of transcoding between the codec type included in the SDP offer and the codec type currently in use in the forwarding destination, the third step involves including the codec type currently in use in the forwarding destination into the SDP offer in the SIP message to be transmitted.

A gist of a communication method according to one aspect of the invention is that, in a communication method executed between multiple communication devices, the method comprising causing a certain communication device of the communication devices to: store a codec type currently in use that is determined by Session Description Protocol (SDP) negotiation into a codec information storing unit and if the certain communication device is determined not to execute transcoding of media data and receives a Session Initiation Protocol (SIP) message containing SDP offer that includes a codec type currently in use in a forwarding source, forward the SIP message without adding the codec type to the SDP offer.

A gist of a communication device according to one aspect of the invention is that a communication device includes: a transcoding unit that executes transcoding of media data; a codec information storing unit that stores a codec type currently in use that is determined by Session Description Protocol (SDP) negotiation; and an SDP processing unit that, if a Session Initiation Protocol (SIP) message containing SDP offer is received, includes a codec type currently in use in a forwarding destination into the SDP offer when forwarding the SIP message.

A gist of a communication device according to one aspect of the invention is that a communication device includes: a codec information storing unit that stores a codec type currently in use that is determined by Session Description Protocol (SDP) negotiation; and an SDP processing unit that, if the communication device is determined not to execute transcoding of media data and receives a Session Initiation Protocol (SIP) message containing an SDP offer that includes a codec type currently in use in a forwarding source, forwards the SIP message without adding the codec type to the SDP offer.

A gist of a communication system according to one aspect of the invention is that a communication system includes: a first communication device; and a second communication device, in which the first communication device includes a codec information storing unit that stores a codec type currently in use that is determined by Session Description Protocol (SDP) negotiation and an SDP processing unit that, if the first communication device is determined not to execute transcoding of media data and receives a Session Initiation Protocol (SIP) message containing an SDP offer that includes a codec type currently in use in a forwarding source, forwards the SIP message to the second communication device without adding the codec type into the SDP offer, and the second communication device includes a transcoding unit that executes transcoding of media data, a codec information storing unit that stores a codec type currently in use that is determined by the SDP negotiation, and an SDP processing unit that, if the SIP message is received, includes a codec type currently in use in a forwarding destination into the SDP offer when forwarding the SIP message.

A gist of a communication program according to one aspect of the invention is to cause a computer to execute the communication method described above.

Effect of the Invention

According to the present invention, it is possible to fix a network (outgoing side, incoming side) determined to execute transcoding.

BRIEF DESCRIPTION OF THE DRAWINGS

FIG. 7 is a diagram that illustrates a processing procedure of transcoding.

MODE FOR CARRYING OUT THE INVENTION

Hereinafter, two embodiments are described for a method of fixing a network (IMS network, SBC) determined to execute transcoding on an initial SDP offer transmitting side or an initial SDP answer transmitting side.

First Embodiment

In First Embodiment, an IMS network that is to execute transcoding is selected by negotiation between an IMS network of SDP offer transmitting side and an IMS network of SDP answer transmitting side in first SDP negotiation (first SDP offer/answer).

Figure 1:
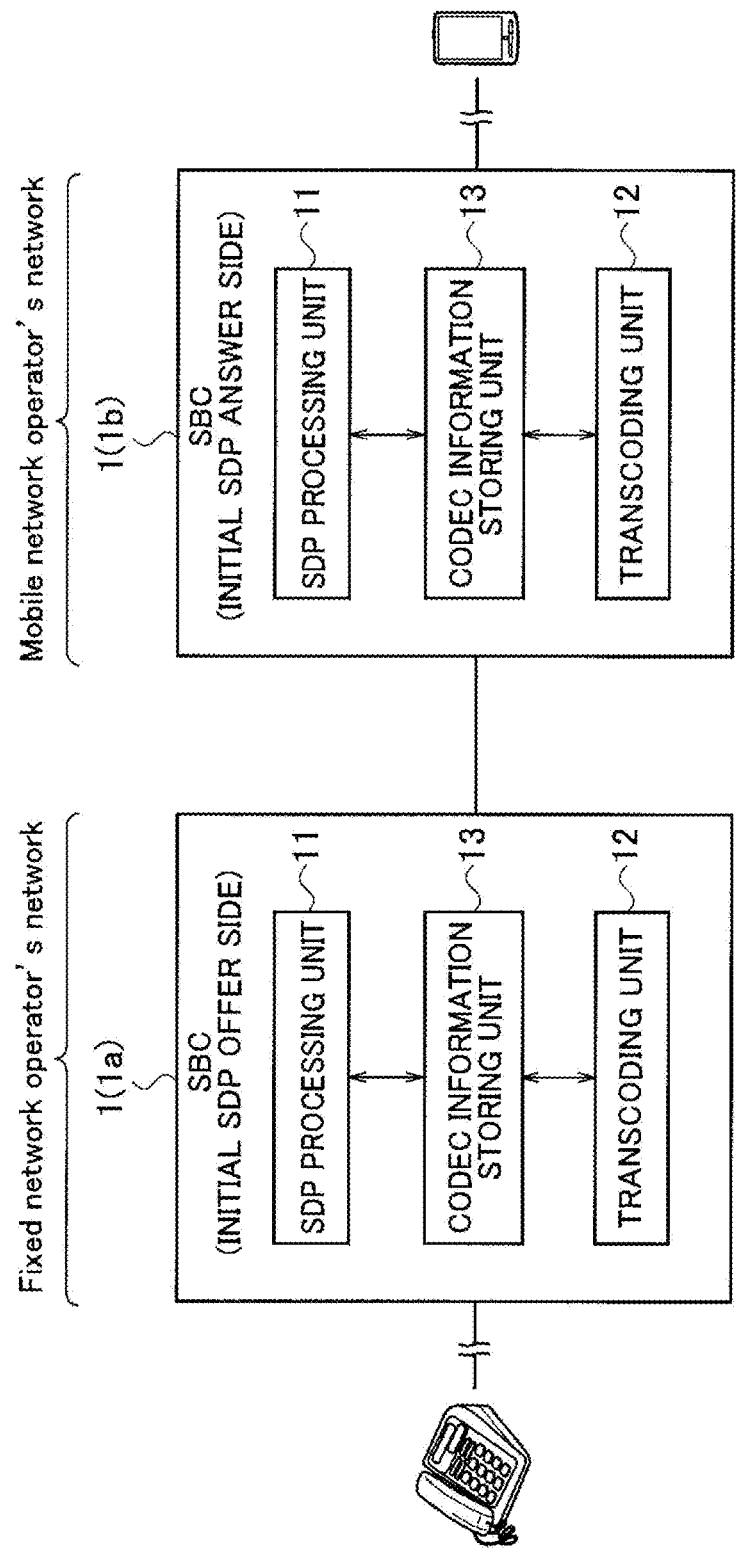
FIG. 1 is a diagram that illustrates an overall configuration of a call control system and a functional block configuration of an SBC.

FIG. 1 is a diagram that illustrates an overall configuration of a call control system and a functional block configuration of an SBC according to this embodiment. This call control system includes an SBC 1a and an SBC 1b interconnecting with each other. In this embodiment, the SBC 1a is provided in an IMS network of initial SDP offer transmitting side (e.g., IMS network including a fixed terminal that supports only a G.711μ-law audio codec). Meanwhile, the SBC 1b is provided in an IMS network of initial SDP answer transmitting side (e.g., IMS network including a mobile terminal that supports only an AMR audio codec). Note that SBC is an abbreviation of a session border controller, which is usually an intermediate node provided around a boundary of the IMS network. Hereinafter, functions of the SBC 1a and the SBC 1b are described.

Each of the SBC 1a and the SBC 1b includes an SDP processing unit 11, a transcoding unit 12, and a codec information storing unit 13.

The SDP processing unit 11 has not only a conventional function that is for example SDP rewrite processing (such as processing of adding and deleting a codec to and from the SDP) but also a function of selecting an IMS network that is to execute transcoding by negotiation. Specifically, the SDP processing unit 11 sets an information element (parameter information) that requests any of the IMS network to execute transcoding into the SDP and, at a timing when the SDP negotiation is performed, uses that information element to select an IMS network that executes transcoding with another IMS network (SBC).

For example, when the SBC 1a determines (requests) to execute transcoding in the own IMS network (SBC 1a) when transmitting the SDP offer to the other IMS network (SBC 1b), the SBC 1a sets an information element indicating that the transcoding is charged with the SDP offer transmitting side. For example, that information element is set as a transcoding execution point designation parameter "transcoder", and "own-side" is set as a value of that information element. On the other hand, when the SBC 1a wants (requests) the other IMS network (SBC 1b) to be in charge of transcoding, the SBC 1a sets "opposite-side" as the value of the above-described information element. That information element and the value of that information element can be used in an arbitrary form such as a header field of the SIP and a value of that header field, "attribute" of the SDP, and the like.

If the other IMS network (SBC 1b) cannot execute transcoding even when the SBC 1a wants (requests) that other IMS network to be in charge of transcoding, that other IMS network may request the SBC 1a to be in charge of transcoding.

Thus, the SDP processing unit 11 further has a function of changing the above-described information element so as to indicate an IMS network other than the IMS network requested by that information element if the IMS network requested by that information element cannot execute transcoding.

The transcoding unit 12 has not only a conventional function of transcoding a media packet (media data) but also a function of executing or not executing transcoding depending on a result of the negotiation on a transcoding executor by the SDP processing unit 11. Specifically, when the IMS network determined to execute transcoding is the own IMS network, the transcoding unit 12 executes the transcoding, and when the IMS network determined to execute transcoding is the other IMS network, the transcoding unit 12 executes no transcoding.

The codec information storing unit 13 has not only a conventional function of storing codec information that can be transcoded by the own IMS network (own SBC) or a terminal in the own IMS network (e.g., when the G.711μ-law audio codec is supported by the own IMS network, G.711μ-law) and the operator policy defined with the agreement between the carriers or the SLA and so on, but also has a function of storing the above-described information element to be set or already set in the SDP while allowing that information element to be read or referred by the SDP processing unit 11 or the transcoding unit 12.

Note that, in the present invention, transcoding mainly indicates a function and processing of converting a codec (coding system) of audio and video communication media. For example, this is conversion of the G.711μ-law audio codec to the AMR audio codec and its inverse conversion. Note that G.711μ-law and AMR are an example of codecs, and the present invention is not limited to a specific type of codec.

So far, the functions of the SBC 1a and the SBC 1b are schematically described. However, detailed descriptions of the functions of the SBC 1a and the SBC 1b are needed for actually selecting the IMS network that is to execute transcoding by negotiation. Thus, specific operations performed by the SBC 1a (initial SDP offer transmitting side) and the SBC 1b (initial SDP answer transmitting side) are respectively exemplified in Table 1 and Table 2. The SDP processing unit 11 of the SBC 1a executes operation and processing according to the described details in Table 1 while the SDP processing unit 11 of the SBC 1b executes operation and processing according to the described details in Table 2.

Table 1

Table 1: Operation of Initial SDP Offer Transmitting Side

| Receiving condition | | Receive from the own network (own network -> SBC -> other network) | Receive from the own network (own network <- SBC <- other network) |
|---|---|---|---|
| SDP offer | Initial | If it is set to execute transcoding when the own SBC is the initial SDP offer side, add one or more. transcodable codecs into a codec list, set | |

| Receiving condition | Receive from the own network (own network -> SBC -> other network) | Receive from the own network (own network <- SBC <- other network) |
|---|---|---|
| Subsequent | "own-side", and transmit the SDP offer to the other network. If it is not set to execute transcoding when the own SBC is the initial SDP offer side, add no codec, set "opposite-side", and transmit the SDP offer to the other network. If it is set to execute transcoding when the own SBC is the initial SDP offer side or if "opposite-side" is set in the SDP previously received from the other network and a transcodable codec is included, add one or more transcodable codecs into the codec list, set "own-side", and transmit the SDP offer to the other network. If it is not set to execute transcoding when the own SBC is the initial SDP offer side, add no codec, set "opposite-side", and transmit the SDP offer to the other network. | If "own-side" is set in the received SDP offer, delete "own-side" and transmit (transparently) the SDP offer to the own network. If "opposite-side" is set and it is set to execute transcoding when the own SBC is the initial SDP offer side, add one or more transcodable codecs into the codec list and transmit the SDP offer to the own network. If transcoding is already being executed by the own SBC when the SDP offer is received, at least include the codec currently in use on the own network side as the codec to be added. |
| SDP answer (initial/subsequent) | If "own-side" was set in the previously received SDP offer, set "opposite-side" into the SDP answer, and if "opposite-side" was set in the previously received SDP offer, set "own-side" into the SDP answer. If the SDP answer includes the codec included in the previously received SDP offer, transmit (transparently) the SDP answer to the other network (no transcoding occurs). If the SDP answer does not include the codec included in the previously received SDP offer | If the SDP answer includes the codec included in the previously received SDP offer, transmit (transparently) the SDP answer to the own network (no transcoding occurs). If the SDP answer does not include the codecs included in the previously received SDP offer, but the previously transmitted codec added by the own SBC, choose one from the codec included in the previously received SDP offer, set its codec information to the SDP answer, and transmit the SDP answer to the other |

| Receiving condition | Receive from the own network (own network -> SBC -> other network) | Receive from the own network (own network <- SBC <- other network) |
|---|---|---|
|  | but the previously transmitted codec added by the own SBC, choose one from the codecs included in the previously received SDP offer, set its codec information to the SDP answer, and transmit the SDP answer to the other network (transcoding occurs). | network (transcoding occurs). |
| SDP set to 488 response | If "opposite-side" was set in the previously received SDP offer, set "opposite-side" into the SDP and transmit the SDP to the other network. | Transmit the received SDP to the own network. |

Note:
Since "own-side" and "opposite-side" are parameters of hop by hop, they will be deleted after being saved by the SBC. This operation is a common operation and thus not being described in the table.

TABLE 2

Operation of Initial SDP Answer Transmitting Side

| Receiving condition | Receive from the own network (other network <- SBC <- own network) | Receive from 4.1 the other network (other network -> SBC -> own network) |
|---|---|---|
| SDP offer | Initial | If "own-side" is set in the received SDP offer, transmit (transparently) the SDP offer to the own network. If "opposite-side" is set and it is set to execute transcoding when the own SBC is the initial SDP answer side, add one or more transcodable codecs into the codec list and transmit the SDP offer to the own network. If "opposite-side" is set and it is set to not execute transcoding when the own SBC is the initial SDP answer side, transmit (transparently) the initial SDP offer to the own network. |

TABLE 2-continued

Operation of Initial SDP Answer Transmitting Side

| Receiving condition | Receive from the own network (other network <- SBC <- own network) | Receive from 4.1 the other network (other network -> SBC -> own network) |
|---|---|---|
| Subsequent | If it is set to execute transcoding when the own SBC is the initial SDP answer side, or if "opposite-side" was set in the SDP previously received from the other network and a transcodable codec is included, add one or more transcodable codecs into the transmit the SDP offer to the other network. If it is not set to execute transcoding when the own SBC is the initial SDP answer side, add no codec, set "opposite-side", and transmit the SDP offer to the other network. | If "own-side " is set in the received SDP offer, transmit the SDP offer to the own network, and if "opposite-side" is set and it is set to execute transcoding when the own SBC is the initial SDP answer side, add one or more transcodable codecs into the codec list and transmit the SDP offer to the own network. If transcoding is already being executed by the own SBC, at least include the codec currently in use on the own network side as the codec to be added. |
| SDP answer (initial/subsequent) | If "own-side", and set in the previously received SDP offer, set "opposite-side" into the SDP answer, and if "opposite-side" was set in the previously received SDP offer, set "own-side" into the SDP answer. If the SDP answer includes the codec included in the previously received SDP offer, transmit the SDP answer to the other network (no transcoding occurs). If the SDP answer does not include the codec included in the previously received SDP offer but the previously transmitted codec added by the own SBC, choose one from the codecs included in the previously received SDP offer, set its codec information to the SDP answer, and transmit the SDP answer to the other | If the SDP answer includes the codec included in the previously received SDP offer, transmit (transparently) the SDP answer to the own network (no transcoding occurs). If the SDP answer does not include the codec included in the previously received SDP offer but the previously transmitted codec added by the own SBC, choose one from the codecs included in the previously received SDP offer, set its codec information to the SDP answer, and transmit the SDP answer to the own network (transcoding occurs). |
| SDP set to 488 response | network (transcoding occurs). If "opposite-side" was set in the previously received SDP offer, set "opposite-side" into the SDP and transmit the SDP to the other network. | Transmit the received SDP to the own network. |

Note:
Since "own-side" and "opposite-side" are parameters of hop by hop, they will be deleted after being saved by the SBC. This operation is a common operation and thus not being described in the table.

Next, a negotiation operation for selecting an executor (IMS network, SBC) of transcoding is described.

Figure 2:
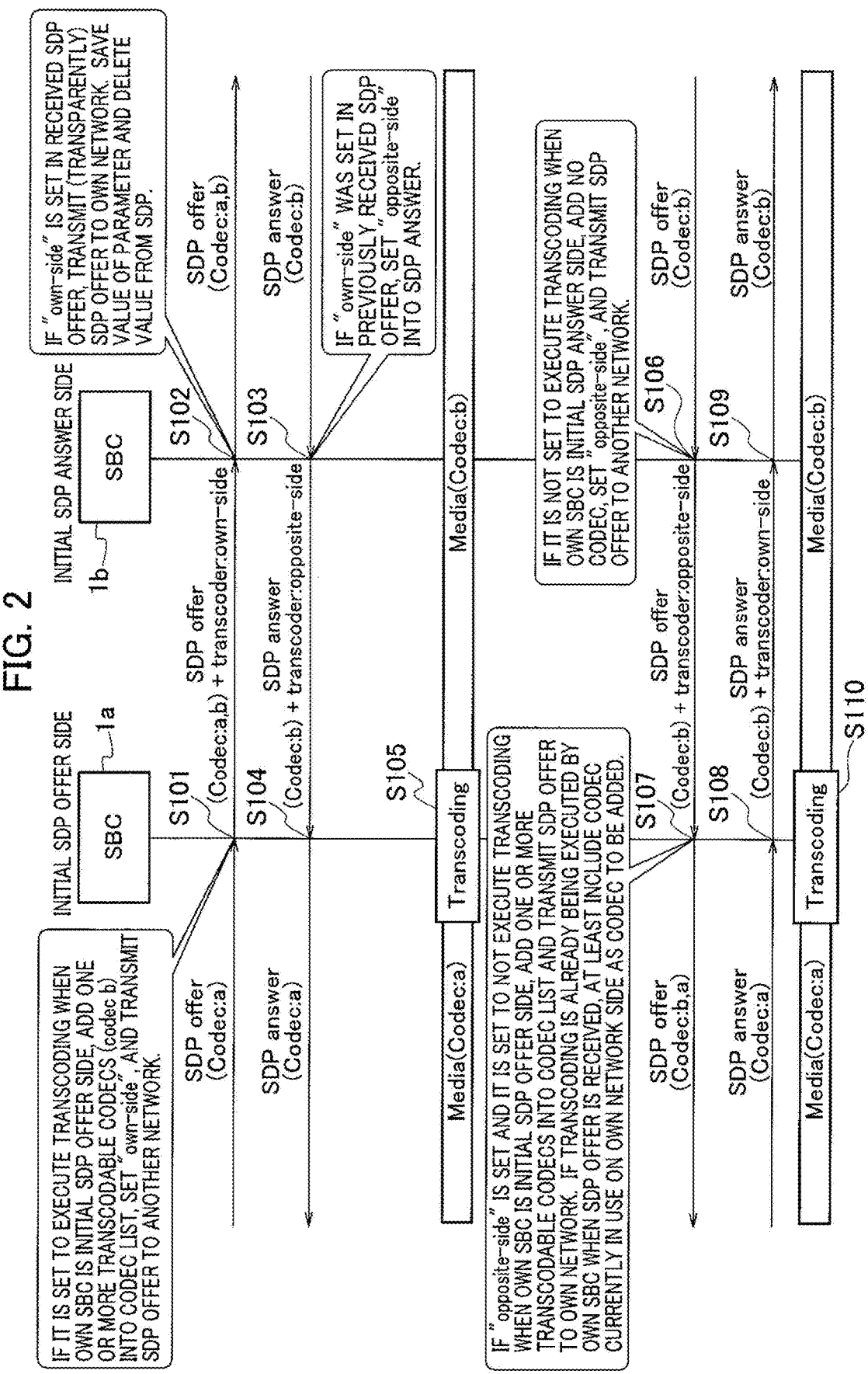
FIG. 2 is a diagram that illustrates a processing flow of a negotiation operation when transcoding is determined to be executed on an initial SDP offer transmitting side.

Firstly, a negotiation operation in a case where transcoding is to be executed in the IMS network of initial SDP offer transmitting side (SBC 1*a*) is described with reference to FIG. 2.

First, after the SBC 1*a* receives the initial SDP offer from the own IMS network, if codec conversion is to be executed in the own IMS network (SBC 1*a*) based on the operator policy, the SBC 1*a* adds the codec that can be transcoded by the own IMS network or a terminal in the own IMS network (codec b) into the codec list set in the initial SDP offer, sets "own-side" into the initial SDP offer, and transmits the initial SDP offer to the other IMS network (SBC 1*b*) (step S101).

Next, once the SBC 1*b* receives the initial SDP offer from the SBC 1*a*, since "own-side" is set in the initial SDP offer, the SBC 1*b* transmits (transparently) the initial SDP offer to the own IMS network (step S102). At this time, the SBC 1*b* stores "own-side" into the codec information storing unit 13 and deletes "own-side" from the initial SDP offer.

Thereafter, a codec that the incoming-side terminal itself in the IMS network of the SBC 1*b* wants to use is selected. Specifically, when the media conditions in the initial SDP offer (codec a, b) includes a media condition that can be used by the incoming-call terminal itself for communication, the incoming-call terminal chooses that media condition (codec b), describes it into the initial SDP answer, and sends back the initial SDP answer.

Next, once the SBC 1*b* receives the initial SDP answer from the own IMS network, since "own-side" was set in the previously received SDP offer, the SBC 1*b* sets "opposite-side" into the initial SDP answer and transmits the initial SDP answer to the other IMS network (SBC 1*a*) (step S103).

Next, once the SBC 1*a* receives the initial SDP answer from the SBC 1*b*, since the initial SDP answer does not include the codec included in the previously received SDP offer (codec a) but the previously transmitted codec added by the SBC 1*a* itself (codec b), the SBC 1*a* chooses one codec from the codecs included in the previously received initial SDP offer (only codec a), sets that codec to the initial SDP answer, and transmits the initial SDP answer to the own IMS network (step S104).

With the processing so far, it is possible to select the IMS network of initial SDP offer transmitting side (SBC 1*a*) as the executor of transcoding based on "own-side" and "opposite-side" communicated between the SBC 1*a* and the SBC 1*b* in the first SDP negotiation. For example, the SBC 1*b* can figure out that the SBC 1*b* does not have to execute transcoding and the SBC 1*a* has to execute transcoding by referring to "own-side" set by the SBC 1*a*. Note that the SBC 1*a* may save "own-side" set by itself in step S101 and "opposite-side" set by the SBC 1*b* in step S104 and figure out that transcoding is executed by itself by referring to them.

Thereafter, when the media packet is transmitted from the other IMS network (SBC 1*b*), the SBC 1*a* executes transcoding of "codec b→a" and transmits the media packet to the own IMS network, and when the media packet is transmitted from the own IMS network, the SBC 1*a* executes transcoding of "codec a→b" and transmits the media packet to the other IMS network (step S105).

Then, a case where subsequent SDP offer is generated in the IMS network of initial SDP answer transmitting side is described.

Once the SBC 1*b* receives the subsequent SDP offer from the own IMS network, since the executor of transcoding is not the SBC 1*b* itself, the SBC 1*b* adds no codec into the codec list set in the subsequent SDP offer, sets "opposite-side" into the subsequent SDP offer, and transmits the subsequent SDP offer to the other IMS network (SBC 1*a*) (step S106).

Next, once the SBC 1*a* receives the subsequent SDP offer from the SBC 1*b*, since the executor of transcoding is the SBC 1*a* itself, the SBC 1*a* adds the codec that can be transcoded by the own IMS network or a terminal in the own IMS network (codec a) into the codec list set in the subsequent SDP offer, and transmits the subsequent SDP offer to the own IMS network (step S107).

Note that, if the SBC 1*a* is already executing transcoding by itself when receiving the subsequent SDP offer from the SBC 1*b* in step S107, the SBC 1*a* at least includes the codec currently in use in the own IMS network (codec a) as the codec to be added.

In addition, in step S107, independent of the result of selecting by the first SDP negotiation, the SBC 1*a* may newly select itself as the executor of transcoding based on "opposite-side" set in the subsequent SDP offer or the operator policy.

Next, once the SBC 1*a* receives subsequent SDP answer from the own IMS network, since the subsequent SDP answer does not include the codec included in the previously received SDP offer (codec b) but the previously transmitted codec added by the SBC 1*a* itself (codec a), the SBC 1*a* chooses one codec from the codecs included in the previously received SDP offer (only codec b), sets that codec to the subsequent SDP answer, and transmits the subsequent SDP answer to the other IMS network (SBC 1*b*) (step S108). At this time, since "opposite-side" was set in the previously received SDP offer, the SBC 1*a* sets "own-side" into the subsequent SDP offer.

Next, once the SBC 1*b* receives the subsequent SDP answer from the SBC 1*a*, since the subsequent SDP answer includes the codec included in the previously received SDP offer (codec b), the SBC 1*b* transmits (transparently) the subsequent SDP answer to the own IMS network (step S109).

Thereafter, when the media packet is transmitted from the other IMS network (SBC 1*b*), the SBC 1*a* executes the transcoding of "codec b→a" and transmits the media packet to the own IMS network, and when the media packet is transmitted from the own IMS network, the SBC 1*a* executes the transcoding of "codec a→b" and transmits the media packet to the other IMS network (step S110).

With the processing in steps S106 to S110, even when the subsequent SDP offer is generated in the IMS network of initial SDP answer transmitting side, it is possible to continue the transcoding in the IMS network of initial SDP offer transmitting side (SBC 1*a*).

Figure 3:
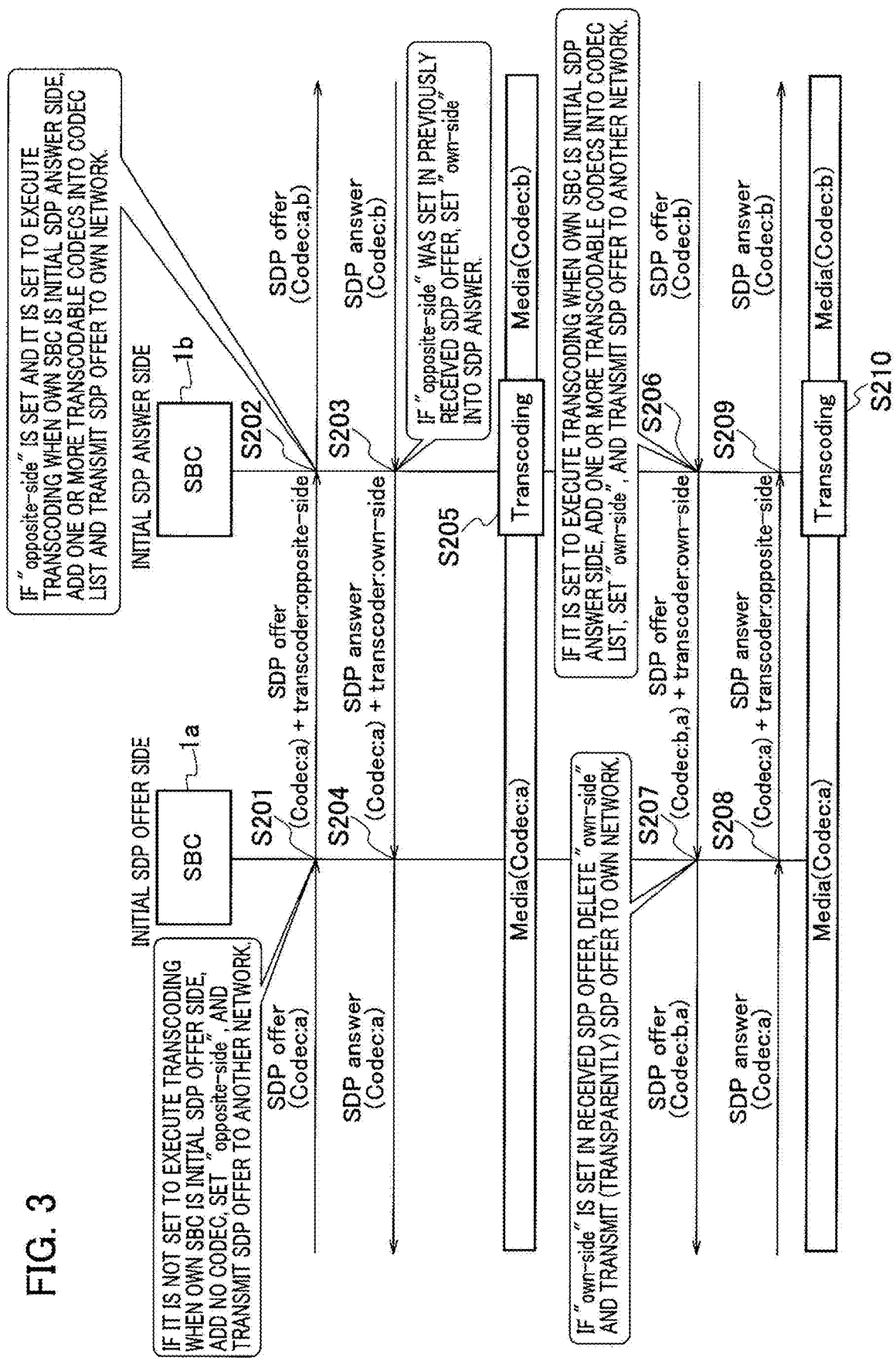
FIG. 3 is a diagram that illustrates a processing flow of a negotiation operation when transcoding is determined to be executed on an initial SDP answer transmitting side.

Next, a negotiation operation in a case where transcoding is to be executed in the IMS network of initial SDP answer transmitting side (SBC 1*b*) is described with reference to FIG. 3.

First, after the SBC 1*a* receives the initial SDP offer from the own IMS network, if no codec conversion is executed in the own IMS network (SBC 1*a*) based on the operator policy, the SBC 1*a* adds no codec into the codec list set in the initial SDP offer, sets "opposite-side" into the initial SDP offer, and transmits the initial SDP offer to the other IMS network (SBC 1*b*) (step S201).

Next, once the SBC 1*b* receives the initial SDP offer from the SBC 1*a*, if "opposite-side" is set in the initial SDP offer and the codec conversion is to be executed in the own IMS network (SBC 1*b*) based on the operator policy, the SBC 1*b* adds the codec that can be transcoded by the own IMS network or a terminal in the own IMS network (codec b) into the codec list set in the initial SDP offer, and transmits the initial SDP offer to the own IMS network (step S202).

Thereafter, the codec that the incoming-side terminal itself in the IMS network of the SBC 1*b* wants to use is selected. Specifically, when the media conditions in the initial SDP offer (codec a, b) includes a media condition that can be used by the incoming-call terminal itself for communication, the incoming-call terminal chooses that media condition (codec b), describes it into the initial SDP answer, and sends back the initial SDP answer.

Next, once the SBC 1*b* receives the initial SDP answer from the own IMS network, since "opposite-side" was set in the previously received SDP offer, the SBC 1*b* sets "own-side" into the initial SDP answer and transmits the initial SDP answer to the other IMS network (SBC 1*a*) (step S203).

Next, once the SBC 1*a* receives the initial SDP answer from the SBC 1*b*, since the initial SDP answer includes the codec included in the previously received SDP offer (codec a), the SBC 1*a* transmits (transparently) the initial SDP answer to the own IMS network (step S204).

With the processing so far, it is possible to select the IMS network of initial SDP answer transmitting side (SBC 1*b*) as the executor of transcoding based on "own-side" and "opposite-side" communicated between the SBC 1*a* and the SBC 1*b* in the first SDP negotiation. It is needless to say that the SBC 1*b* may save "opposite-side" set by the SBC 1*a* and figure out that transcoding is executed by itself by referring to it. In addition, the SBC 1*a* may save "own-side" set by the SBC 1*b* and figure out that the SBC 1*a* does not have to execute transcoding and the SBC 1*b* has to execute transcoding by referring to it.

Thereafter, when the media packet is transmitted from the own IMS network, the SBC 1*b* executes the transcoding of "codec b→a" and transmits the media packet to the other IMS network (SBC 1*a*), and when the media packet is transmitted from the other IMS network, the SBC 1*b* executes the transcoding of "codec a→b" and transmits the media packet to the own IMS network (step S205).

Then, a case where the subsequent SDP offer is generated in the IMS network of initial SDP answer transmitting side is described.

Once the SBC 1*b* receives the subsequent SDP offer from the own IMS network, since the executor of transcoding is the SBC 1*b* itself, the SBC 1*b* adds the codec that can be transcoded by the own IMS network or a terminal in the own IMS network (codec a) into the codec list set in the subsequent SDP offer, sets "own-side" into the subsequent SDP offer, and transmits the subsequent SDP offer to the other IMS network (SBC 1*a*) (step S206).

Next, once the SBC 1*a* receives the subsequent SDP offer from the SBC 1*b*, since the executor of transcoding is not the SBC 1*a* itself, the SBC 1*a* adds no codec into the codec list set in the subsequent SDP offer, deletes "own-side" from the subsequent SDP offer, and transmits the subsequent SDP offer to the own IMS network (step S207).

Next, once the SBC 1*a* receives the subsequent SDP answer from the own IMS network, since the subsequent SDP answer includes the codec included in the previously received SDP offer (codec a), the SBC 1*a* transmits (transparently) the subsequent SDP answer to the other IMS network (SBC 1*b*) (step S208). At this time, since "own-side" was set in the previously received SDP offer, the SBC 1*a* sets "opposite-side" into the subsequent SDP offer.

Next, once the SBC 1*b* receives the subsequent SDP answer from the SBC 1*a*, since the subsequent SDP answer does not include the codec included in the previously received SDP offer (codec b) but the previously transmitted codec added by the SBC 1*b* itself (codec a), the SBC 1*b* chooses one codec from the codecs included in the previously received SDP offer (only codec b), sets that codec to the subsequent SDP answer, and transmits (transparently) the subsequent SDP answer to the own IMS network (step S209).

Thereafter, when the media packet is transmitted from the own IMS network, the SBC 1*b* executes the transcoding of "codec b→a" and transmits the media packet to the other IMS network (SBC 1*a*), and when the media packet is transmitted from the other IMS network, the SBC 1*b* executes the transcoding of "codec a→b" and transmits the media packet to the own IMS network (step S210).

With the processing in steps S206 to S210, even when the subsequent SDP offer is generated in the IMS network of initial SDP answer transmitting side, it is possible to continue the transcoding in the IMS network of initial SDP answer transmitting side (SBC 1*b*).

Figure 4:
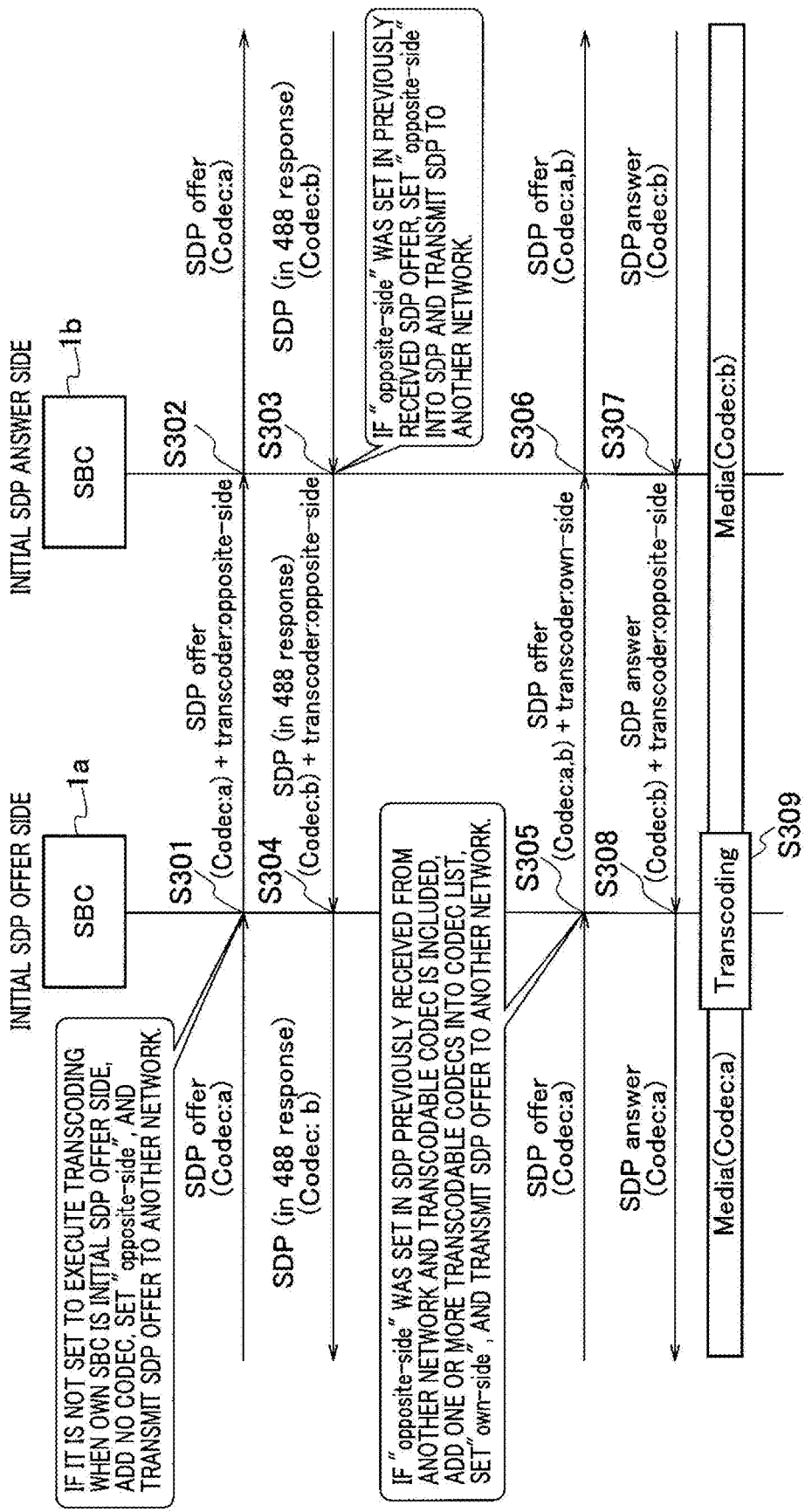
FIG. 4 is a diagram that illustrates a processing flow of a renegotiation operation when transcoding is impossible in an IMS network that is requested to execute the transcoding.

Next, a renegotiation operation in a case where the IMS network that is requested to execute the transcoding cannot execute transcoding is described with reference to FIG. 4.

First, after the SBC 1*a* receives the initial SDP offer from the own IMS network, if no codec conversion is executed in the own IMS network (SBC 1*a*) based on the operator policy, the SBC 1*a* adds no codec into the codec list set in the initial SDP offer, sets "opposite-side" into the initial SDP offer, and transmits the initial SDP offer to the other IMS network (SBC 1*b*) (step S301).

Next, once the SBC 1*b* receives the initial SDP offer from the SBC 1*a*, if no codec conversion is executed in the own IMS network (SBC 1*b*) based on the operator policy although "opposite-side" is set in the initial SDP offer, the SBC 1*b* transmits (transparently) the initial SDP offer to the own IMS network (step S302).

Thereafter, the codec that the incoming-side terminal itself in the IMS network of the SBC 1*b* wants to use is selected. Specifically, when the media condition in the initial SDP offer (codec a) does not include a media condition that can be used by the incoming-call terminal itself for communication, the incoming-call terminal sets the SDP to a 488 response (=Not Acceptable response; error response), describes the media condition that the incoming terminal itself wants to use for communication (codec b) into the SDP, and sends back the SDP.

Next, once the SBC 1*b* receives the SDP set to the 488 response from the own IMS network, since this is the 488 response although "opposite-side" was set in the previously received SDP offer, the SBC 1*b* sets "opposite-side" into the SDP and transmits the SDP to the other IMS network (SBC 1*a*) (step S303).

Note that, in step S303, although the same information element value "opposite-side" is formally set in the SDP, it is actually a request to change the executor of transcoding from the SBC 1*b* to the SBC 1*a*.

Next, once the SBC 1*a* receives the SDP from the SBC 1*b*, since no codec conversion is performed in the own IMS network (SBC 1*a*) at this timing likewise step S301 although "opposite-side" is set in the SDP, the SBC 1*a* transmits (transparently) the SDP to the own IMS network (step S304).

Thereafter, a second initial SDP offer to which the same codec (codec a) is set is transmitted again from the outgoing-call terminal in the IMS network of the SBC 1*a*.

Next, once the SBC 1*a* receives the second initial SDP offer from the own IMS network, if "opposite-side" is set in the SDP previously received from the other IMS network and transcoding can be executed by the SBC 1*a* itself although execution of the codec conversion was not planned in step S301, the SBC 1*a* adds the codec that can be transcoded by the own IMS network or a terminal in the own IMS network into the codec list set in the second initial SDP offer, sets "own-side" into the second initial SDP offer, and transmits the second initial SDP offer to the other IMS network (SBC 1*b*) (step S305).

Step S306 to Step S309 after this are the same as the above-described steps S102 to S105.

According to this embodiment, since the multiple IMS networks (SBC 1*a* and SBC 1*b*) set the information element that requests any of the IMS networks to execute transcoding into the SDP, use that information element to select an IMS network (SBC 1*a* or SBC 1*b*) that is to execute transcoding between the IMS networks (between SBC 1*a* and SBC 1*b*), and execute transcoding of media data in the selected IMS network, it is possible to fix the IMS network that is determined to execute the transcoding.

Thus, since the execution point and the executor of transcoding which consumes enormous resources can be fixed on the initial SDP offer transmitting side or the initial SDP answer transmitting side, it is possible to predict a resource to be required by the communications carrier and to design equipment, and this facilitates organizing access charges between the communications carriers.

In addition, according to this embodiment, when the IMS network requested by the information element of the SDP cannot execute transcoding, that information element is changed so as to indicate an IMS network other than that IMS network, and this makes it possible to appropriately change the IMS network (SBC) that is to execute transcoding. Thus, even when one IMS network cannot execute transcoding, transcoding still can be executed in any different IMS network, and this improves establishment of call connection between the outgoing and incoming terminals.

Second Embodiment

In Second Embodiment, the SDP offer transmitting side and/or the SDP answer transmitting side manage codec information, which is selected by the last SDP negotiation between the two sides of the own IMS network, as session-relevant information element to continue transcoding.

The overall configuration of the call control system according to this embodiment and the functional block configurations of the SBCs 1a, 1b are similar to those of First Embodiment illustrated in FIG. 1.

The SDP processing unit 11 has the conventional function that is for example the SDP rewrite processing (such as processing of adding and deleting a codec to and from the SDP).

The codec information storing unit 13 has not only the conventional function of storing the codec information that can be transcoded by the own IMS network (own SBC) or a terminal in the own IMS network but also a function of storing the before-converted and after-converted codec information selected by the SDP negotiation as the session-relevant information element.

The transcoding unit 12 has not only the conventional function of transcoding the media packet (media data) but also a function of executing or not executing transcoding based on the session-relevant information element of the codec information storing unit 13. Specifically, when the converted codec information managed by the session-relevant information element is not included in the received SDP, the transcoding unit 12 is determined to execute transcoding, and when the converted codec information is included, the transcoding unit 12 is determined to not execute transcoding.

So far, the functions of the SBC 1a and the SBC 1b are schematically described. Note that, more specifically, each SDP processing unit 11 of the SBC 1a and the SBC 1b performs operation and processing according to the operation details exemplified in Table 3 and Table 4.

TABLE 3

Operation of Initial SDP Offer Transmitting Side

| Receiving condition | | Receive from the own network (own network -> SBC -> other network) | Receive from the other network (own network SBC <- other network) |
|---|---|---|---|
| SDP offer | Initial | If it is set to execute transcoding when the own SBC is the initial SDP offer side, add one or more transcodable codecs into the codec list and transmit the SDP offer to the other network. If it is not set to execute transcoding when the own SBC is the initial SDP offer side, add no codec and transmit the SDP offer to the other network. | |
| | Subsequent | The own SBC checks if the codec selected by the previous SDP offer/answer negotiation between the own SBC and a device located in a direction of transmitting the | Same to the left operation |

TABLE 3-continued

Operation of Initial SDP Offer Transmitting Side

| Receiving condition | | Receive from the own network (own network -> SBC -> other network) | Receive from the other network (own network SBC <- other network) |
|---|---|---|---|
| | | SDP offer is included in the received SDP offer, and if the selected codec is not included and also transcoding is possible between the previously negotiated codec and the codec included in the received SDP offer, the own SBC adds the previously negotiated codec. | |
| SDP answer (first/subsequent) | | If the SDP answer includes the codec included in the previously received SDP offer, transmit (transparently) the SDP answer to the other network (no transcoding occurs). If the SDP answer does not include the codec included in the previously received SDP offer but the previously transmitted codec added by the own SBC, choose one from the codecs included in the previously received SDP offer, set its codec information into the SDP answer, and transmit to the other network (transcoding occurs). Save the codec negotiated by the two sides (SDP answer receiving side/transmitting side) of the own SBC and determing to be used. | If the SDP answer includes the codec included in the previously received SDP offer, transmit (transparently) the SDP answer to the other network (no transcoding occurs). If the SDP answer does not include the codec included in the previously received SDP offer but the previously transmitted codec added by the own SBC, choose one from the codecs included in the previously received SDP offer, set its codec information into the SDP answer, and transmit to the other network (transcoding occurs). Save the codec negotiated by the two sides (SDP answering receiving side/transmitting side) of the own SBC and determing to be used. |

TABLE 4

Operation of Initial SDP Answer Transmitting Side

| Receiving condition | | Receive from the own network (other network <- SBC <- own network) | Receive from the other network (other network -> SBC -> own network) |
|---|---|---|---|
| SDP offer | Initial | | If it is set to execute transcoding when the own SBC is the initial SDP answer |

TABLE 4-continued

Operation of Initial SDP Answer Transmitting Side

| Receiving condition | Receive from the own network (other network <- SBC <- own network) | Receive from the other network (other network -> SBC -> own network) |
|---|---|---|
| Subsequent | The own SBC checks if thr codec selected by the previous SDP offer/answer negotiation. between the own SBC and a device located in a direction of transmitting the SDP offer is included in the received SDP offer, and if the selected codec is not included and also transcoding is possible between the previously negotiated codec and the codec included in the received SDP offer, the own SBC adds the previously negotiated codec. | side, add one or more transcodable codecs into the codec list, and transmit the SDP offer to the other network. If it is not set to execute transcoding when the own SBC is the initial SDP answer side, add no codec and transmit the SDP offer to the other network. Same to the left operation |
| SDP answer (first/subsequent) | If the SDP answer includes the codec included in the if the codec previously transmit (transparently) the SDP answer to the other network (no transcoding occurs). If the SDP answer does not include the codec included in the previously received SDP offer but the previously transmitted codec added by the own SBC, choose one from the codecs included in the previously received SDP offer, set its codec information into the SDP answer, and transmit to the other network | If the SDP answer includes the codec included in the operation previously transmit (transparently) the SDP answer to the other network (no transcoding occurs). If the SDP answer does not include the codec included in the previously received SDP offer but the previously transmitted codec added by the own SBC, choose one from the codecs included in the previously received SDP offer, set its codec information into the SDP answer, and transmit to the other network (transcoding occurs). Save the codec negotiated by the two sides (SDP answering receiving side/transmitting side) of the own SBC and determing to be used |
| | (transcoding occurs). Save the codec negotiated by the two sides (SDP answer receiving side/transmitting side) of the own SBC and determing to be used | |

Figure 5:
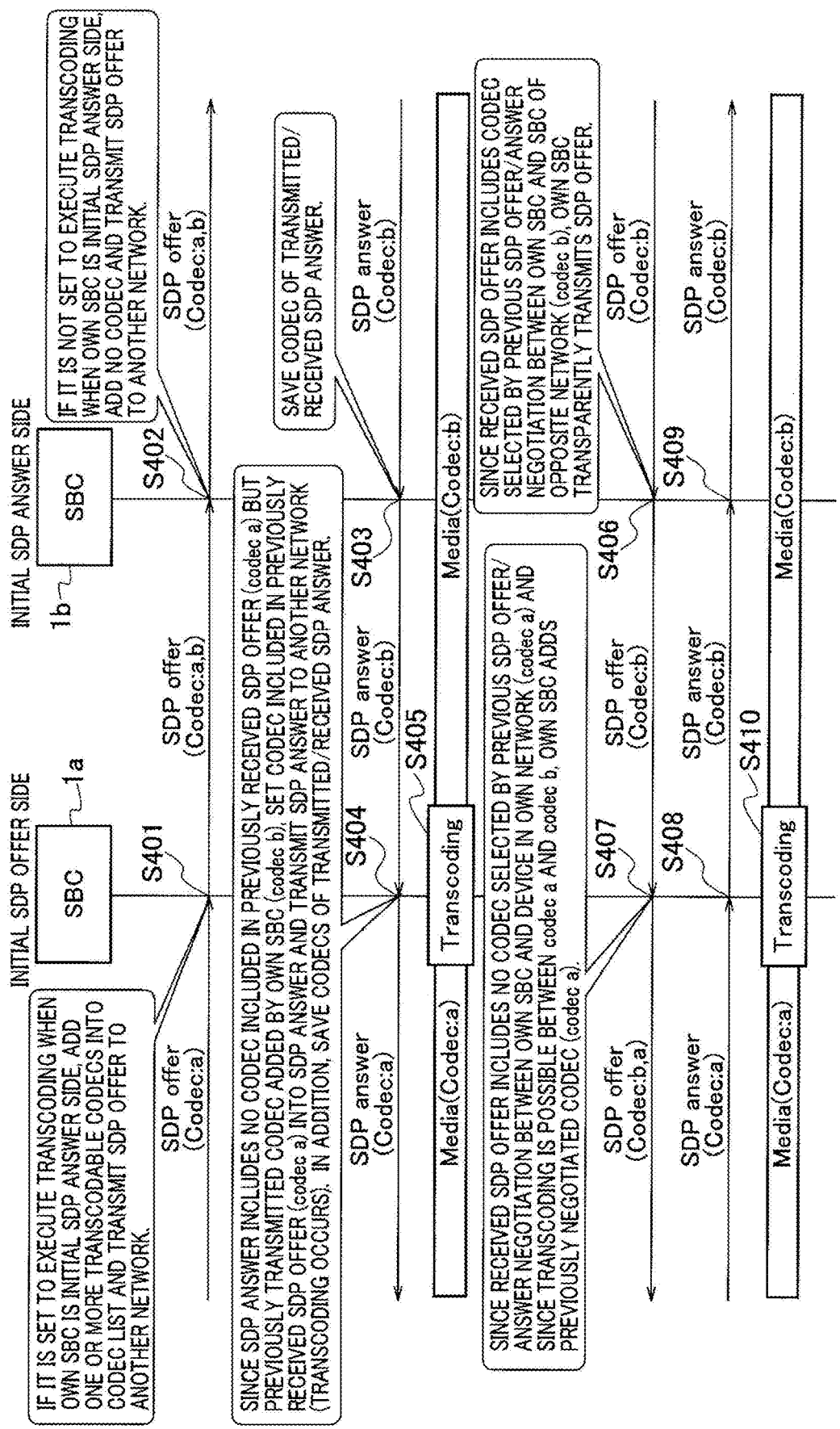
FIG. 5 is a diagram that illustrates a processing flow when transcoding is determined to be executed on the initial SDP offer transmitting side.

Next, an operation in a case where transcoding is determined to be executed in the IMS network of initial SDP offer transmitting side (SBC 1a) is described with reference to FIG. 5.

First, after the SBC 1a receives the initial SDP offer from the own IMS network, if the codec conversion is determined to be executed in the own IMS network, the SBC 1a adds the codec that can be transcoded by the own IMS network or a terminal in the own IMS network (codec b) into the codec list set in the initial SDP offer and transmits the initial SDP offer to the other IMS network (SBC 1b) (step S401).

Next, once the SBC 1b receives the initial SDP offer from the SBC 1a, when no codec conversion is determined to be executed in the own IMS network, the SBC 1b adds no codec into the codec list set in the initial SDP offer and transmits (transparently) the initial SDP offer to the own IMS network (step S402).

Thereafter, the codec that the incoming-side terminal itself in the IMS network of the SBC 1b wants to use is selected. Specifically, when the media conditions in the initial SDP offer (codec a, b) includes a media condition that can be used by the incoming-call terminal itself for communication, the incoming-call terminal chooses that media condition (codec b), describes it into the initial SDP answer, and sends back the initial SDP answer.

Next, once the SBC 1b receives the initial SDP answer from the own IMS network, since the initial SDP answer includes the codec included in the previously received SDP offer, the SBC 1b transmits (transparently) the initial SDP answer to the other IMS network (SBC 1a) (step S403). At this time, the SBC 1b saves information on the received codec (codec b) and information on the transmitted codec (codec b). Particularly, the SBC 1b manages the information on the transmitted codec (codec b) as the converted codec information.

Next, once the SBC 1a receives the initial SDP answer from the SBC 1b, since the initial SDP answer does not include the codec included in the previously received SDP offer (codec a) but the previously transmitted codec added by the SBC 1a itself (codec b), the SBC 1a chooses one codec from the codecs included in the previously received initial SDP offer (only codec a), sets that codec to the initial SDP answer, and transmits the initial SDP answer to the own IMS network (step S404). At this time, the SBC 1a saves information on the received codec (codec b) and information on the transmitted codec (codec a). Particularly, the SBC 1b manages the information on the transmitted codec (codec a) as the converted codec information.

Thereafter, when the media packet is transmitted from the other IMS network (SBC 1b), the SBC 1a executes the transcoding of "codec b→a" and transmits the media packet to the own IMS network, and when the media packet is transmitted from the own IMS network, the SBC 1*a* executes the transcoding of "codec a→b" and transmits the media packet to the other IMS network (step S405).

Then, a case where the subsequent SDP offer is generated in the IMS network of initial SDP answer transmitting side is described.

Once the SBC 1*b* receives the subsequent SDP offer from the own IMS network, since the subsequent SDP offer includes the codec selected by the previous SDP negotiation between the SBC 1*b* itself and the opposite IMS network opposing to itself (SBC 1*a*) (the converted codec saved in step S403 (codec b)), the SBC 1*b* transmits (transparently) the subsequent SDP offer to the other IMS network (SBC 1*a*) (step S406).

Next, once the SBC 1*a* receives the subsequent SDP offer from the SBC 1*b*, since the subsequent SDP offer does not include the codec selected by the previous SDP negotiation between the SBC 1*a* itself and a device in the own IMS network (outgoing-side terminal and the like) (the converted codec saved in step S404 (codec a)) and since transcoding is possible between the codec selected by the previous SDP negotiation (codec a) and the codec included in the subsequent SDP offer (codec b), the SBC 1*a* adds the codec selected by the previous SDP negotiation (codec a) and transmits the subsequent SDP offer to the own IMS network (step S407).

Next, once the SBC 1*a* receives the subsequent SDP answer from the own IMS network, since the subsequent SDP answer does not include the codec included in the previously received SDP offer (codec b) but the previously transmitted codec added by the SBC 1*a* itself (codec a), the SBC 1*a* chooses one codec from the codecs included in the previously received SDP offer (only codec b), sets that codec to the subsequent SDP answer, and transmits the subsequent SDP answer to the other IMS network (SBC 1*b*) (step S408).

Next, once the SBC 1*b* receives the subsequent SDP answer from the SBC 1*a*, since the subsequent SDP answer includes the codec included in the previously received SDP offer (codec b), the SBC 1*b* transmits (transparently) the subsequent SDP answer to the own IMS network (step S409).

Thereafter, when the media packet is transmitted from the other IMS network (SBC 1*b*), the SBC 1*a* executes the transcoding of "codec b→a" and transmits the media packet to the own IMS network, and when the media packet is transmitted from the own IMS network, the SBC 1*a* executes the transcoding of "codec a→b" and transmits the media packet to the other IMS network (step S410).

Figure 6:
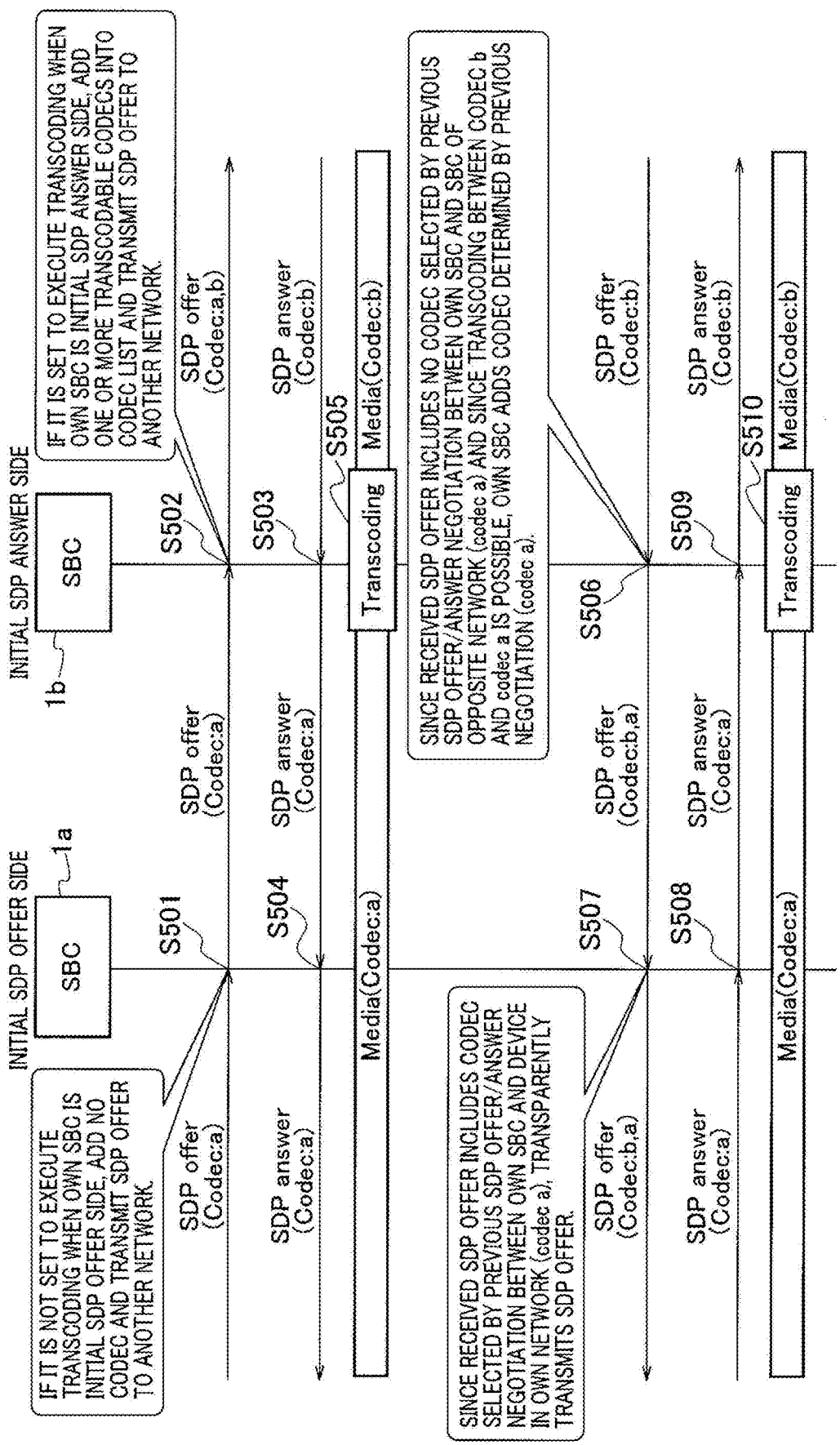
FIG. 6 is a diagram that illustrates a processing flow when transcoding is determined to be executed on the initial SDP answer transmitting side.
Figure 7A:
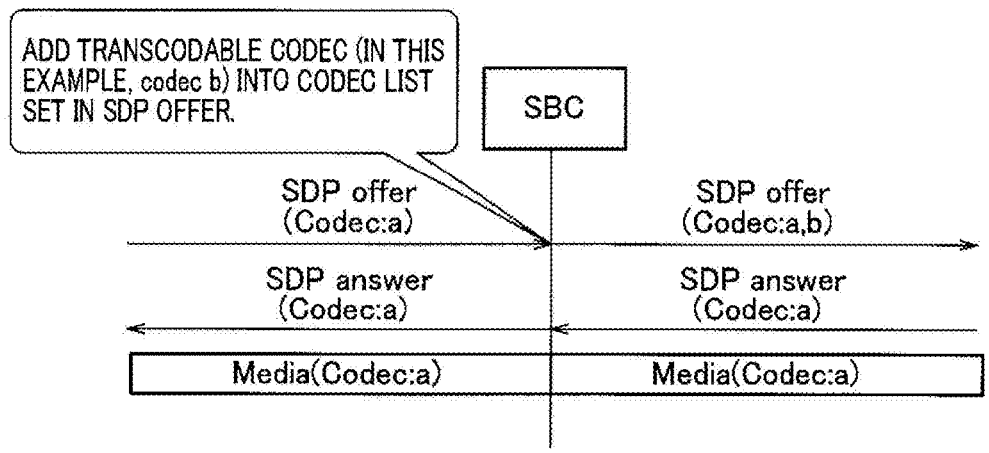
FIGS. 7A and 7B are collectively referred to as FIG. 7.
Figure 7B:
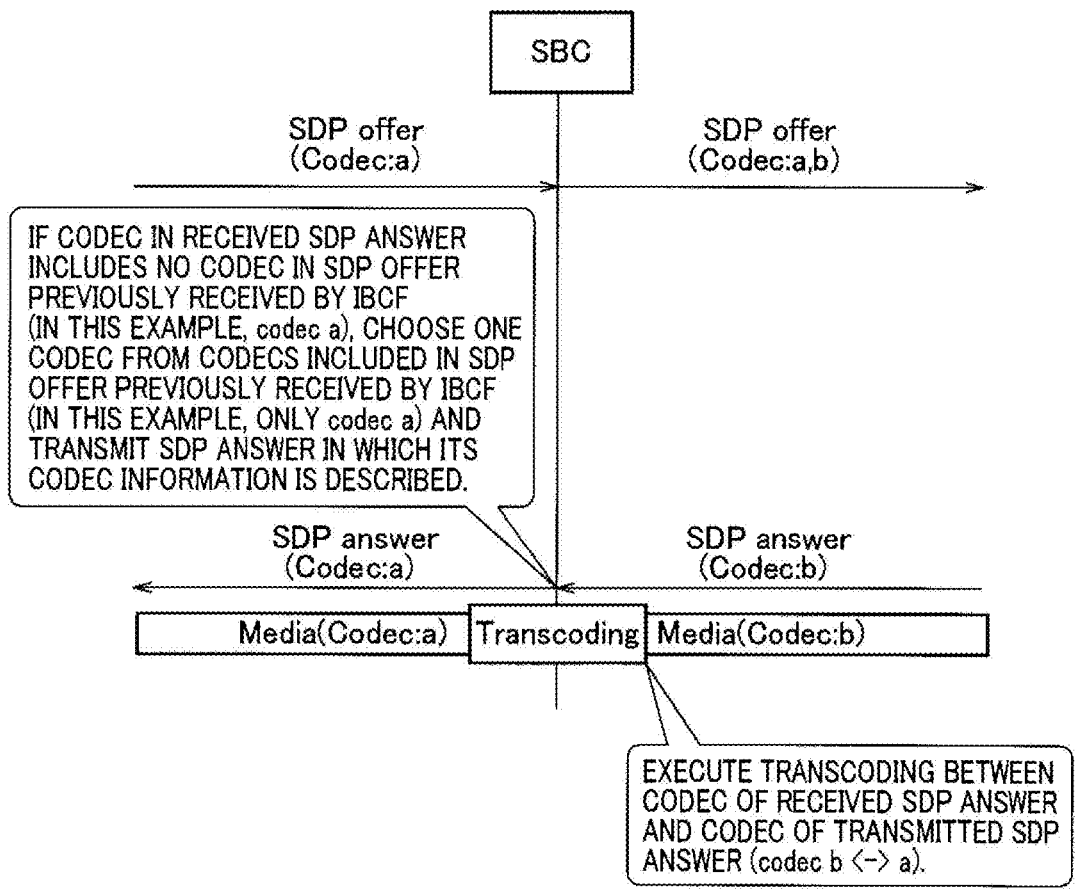
Figure 8:
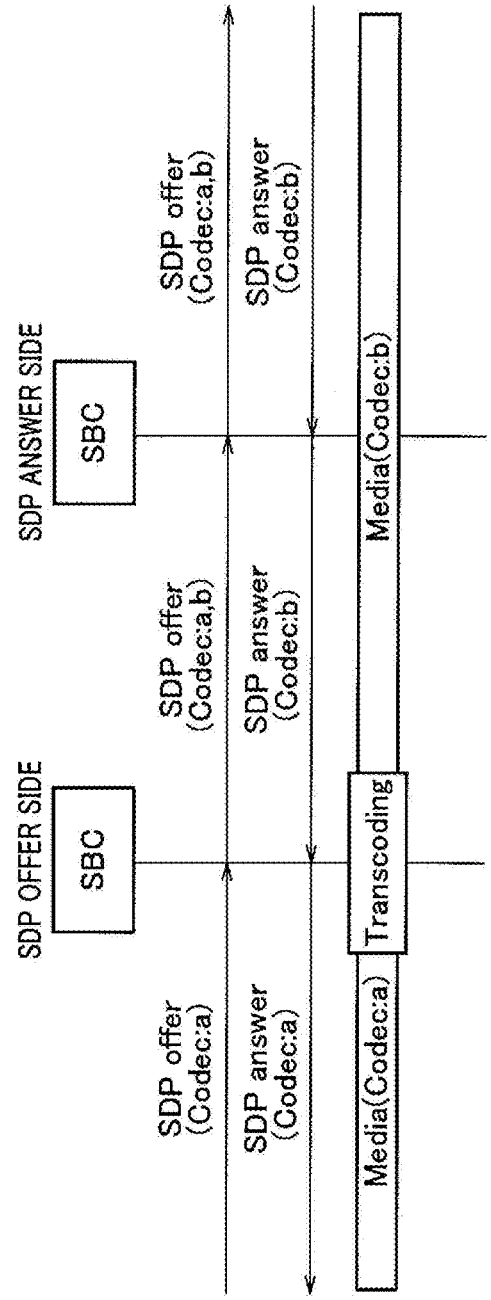
FIG. 8 is a diagram that illustrates a processing procedure of transcoding executed on an SDP offer transmitting side.
Figure 9:
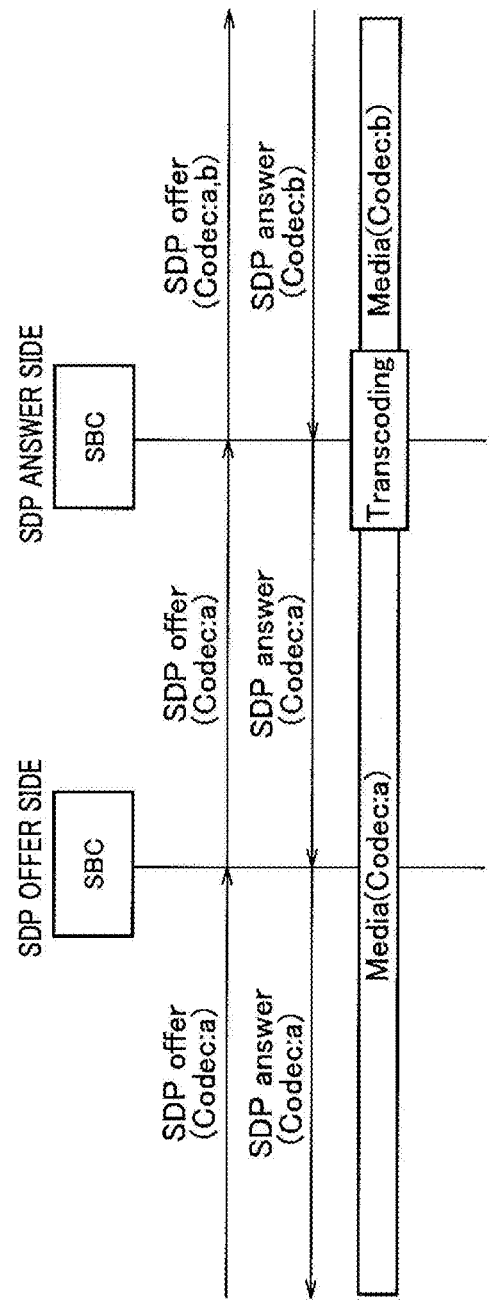
FIG. 9 is a diagram that illustrates a processing procedure of transcoding executed on an SDP answer transmitting side.
Figure 10:
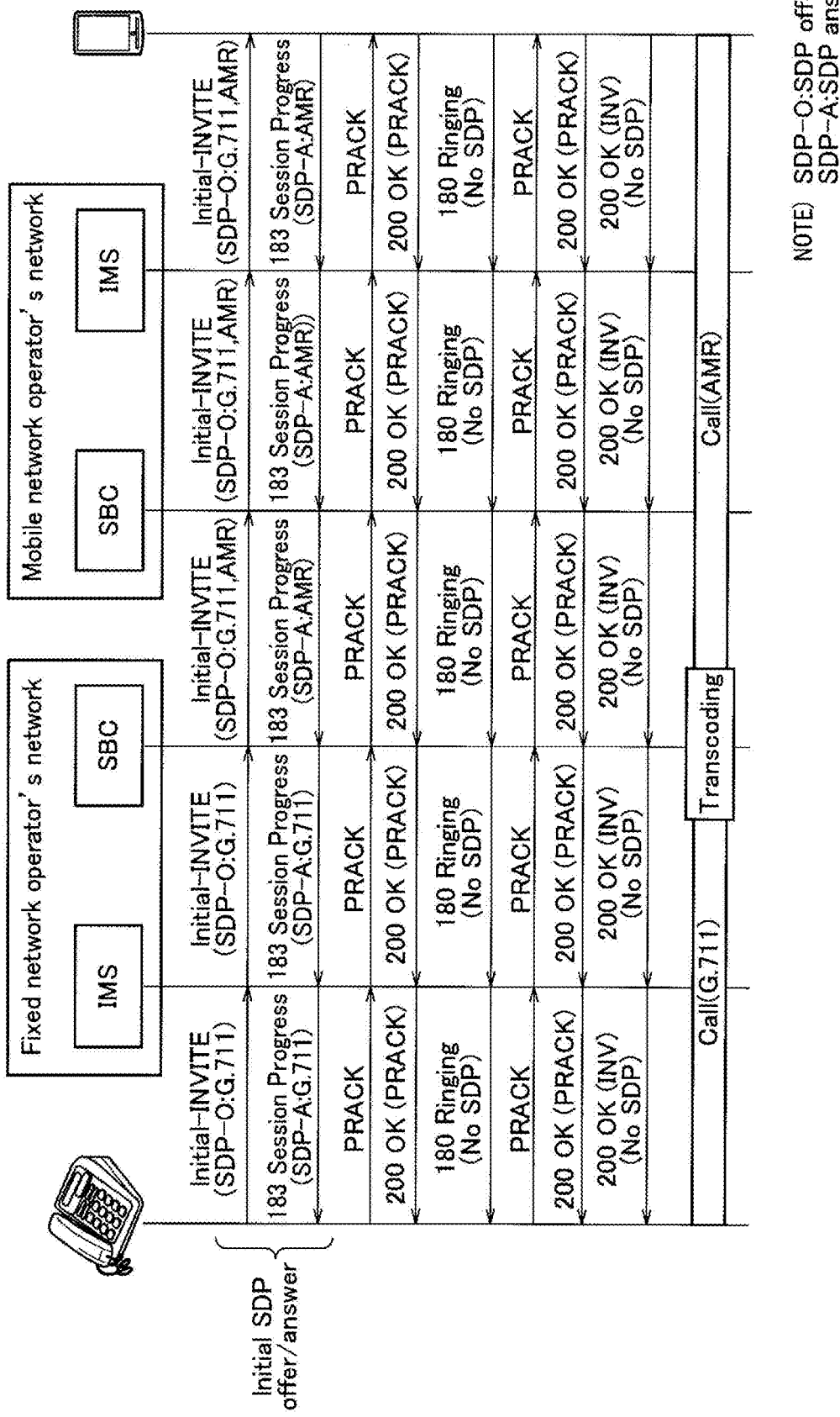
FIG. 10 is a diagram that illustrates a processing procedure of the transcoding executed on the SDP offer transmitting side (specific example for a case of interconnecting a fixed terminal and a mobile terminal).
Figure 11:
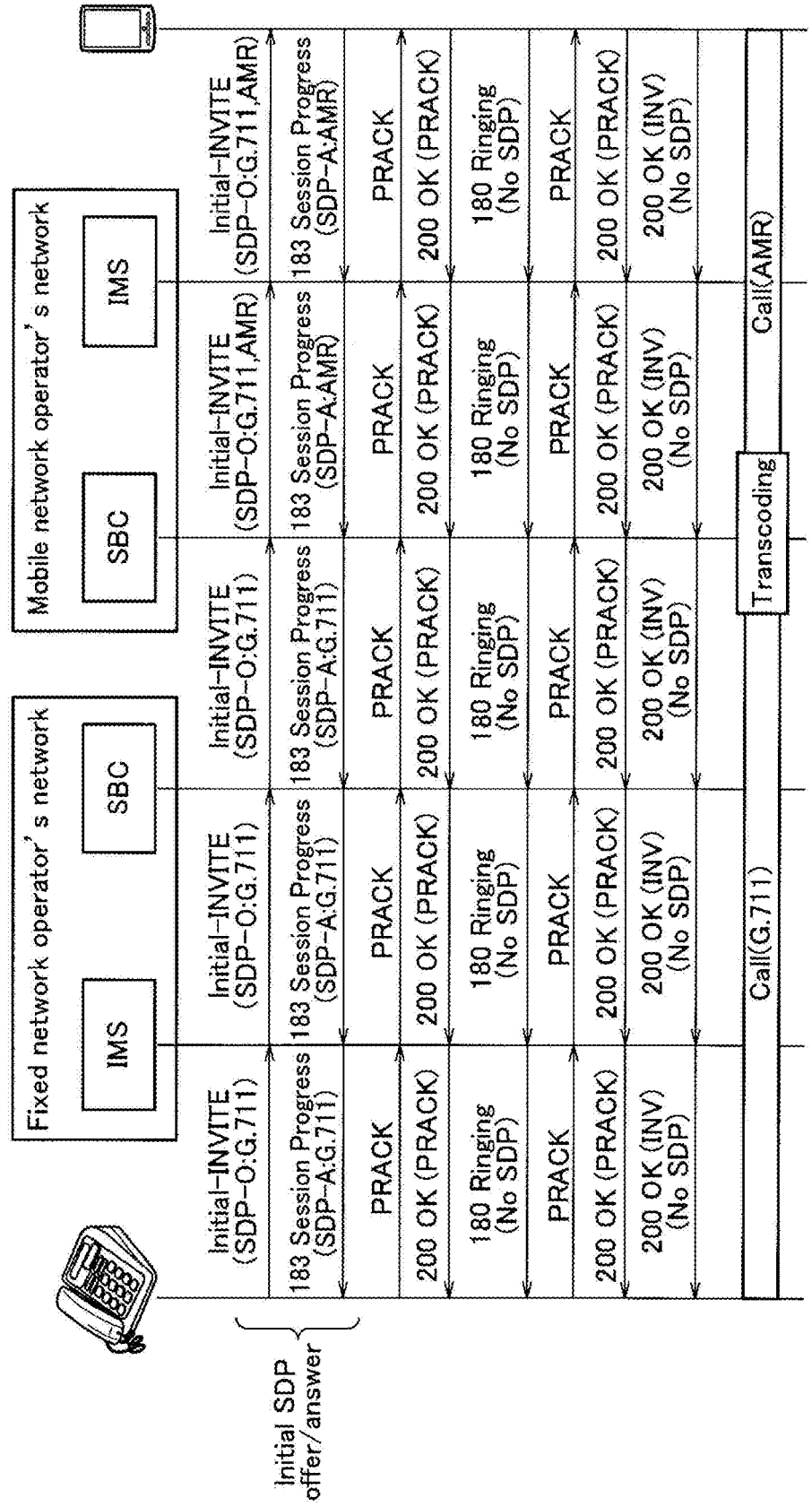
FIG. 11 is a diagram that illustrates a processing procedure of the transcoding executed on the SDP answer transmitting side (specific example for the case of interconnecting the fixed terminal and the mobile terminal).
Figure 12:
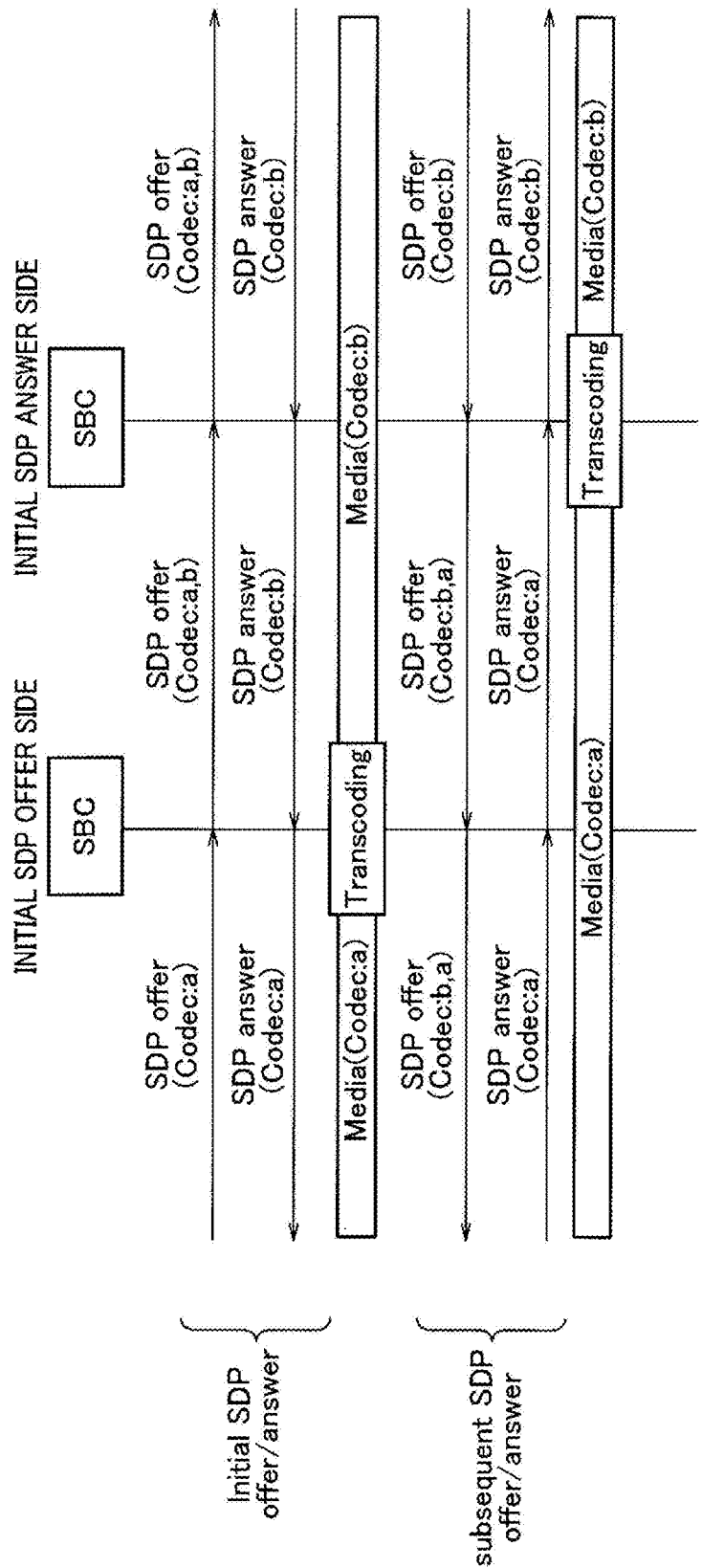
FIG. 12 is a diagram that illustrates a processing procedure of a case where transcoding is determined to be sequentially executed in the SDP offer transmitting side and the SDP answer transmitting side.
Figure 13:
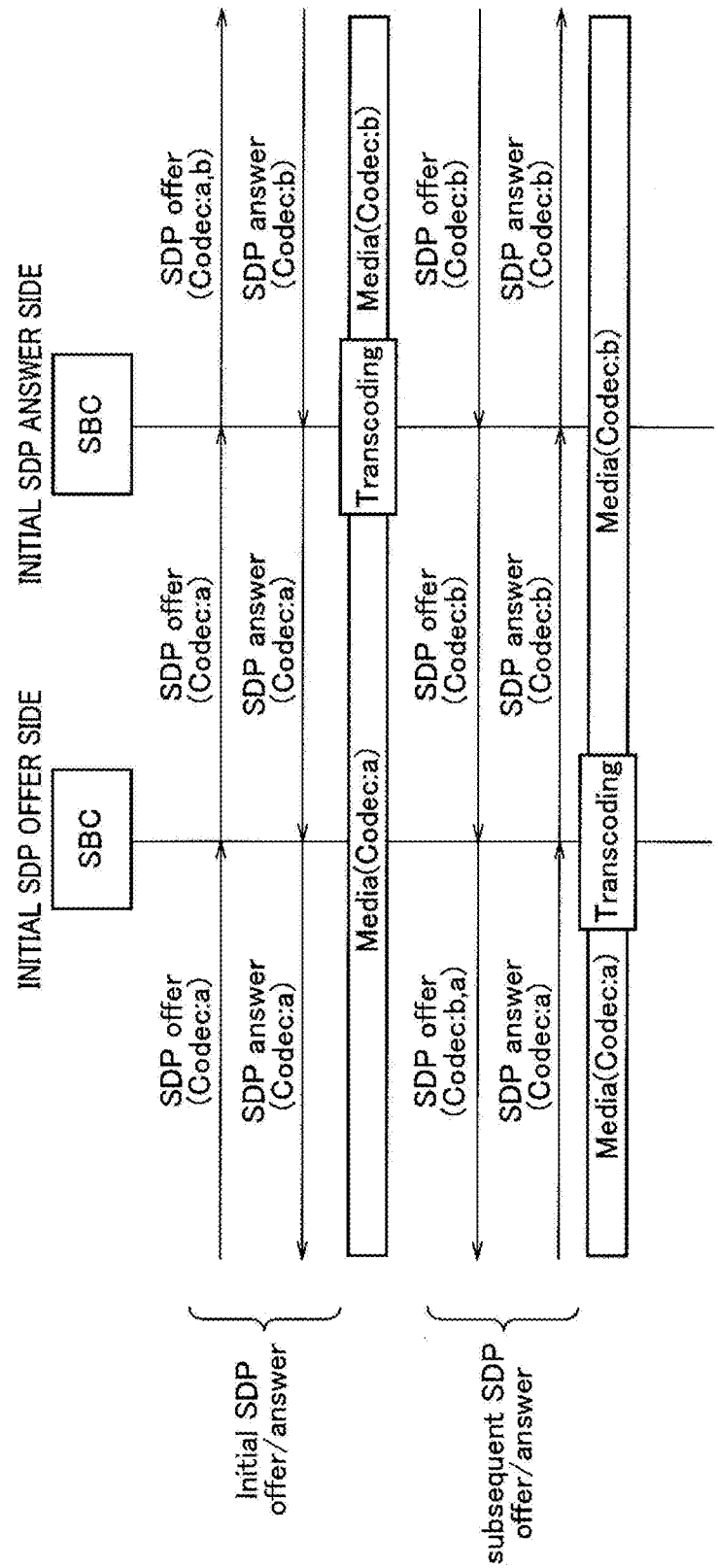
FIG. 13 is a diagram that illustrates a processing procedure of a case where transcoding is determined to be sequentially executed in the SDP answer transmitting side and the SDP offer transmitting side.
Figure 14:
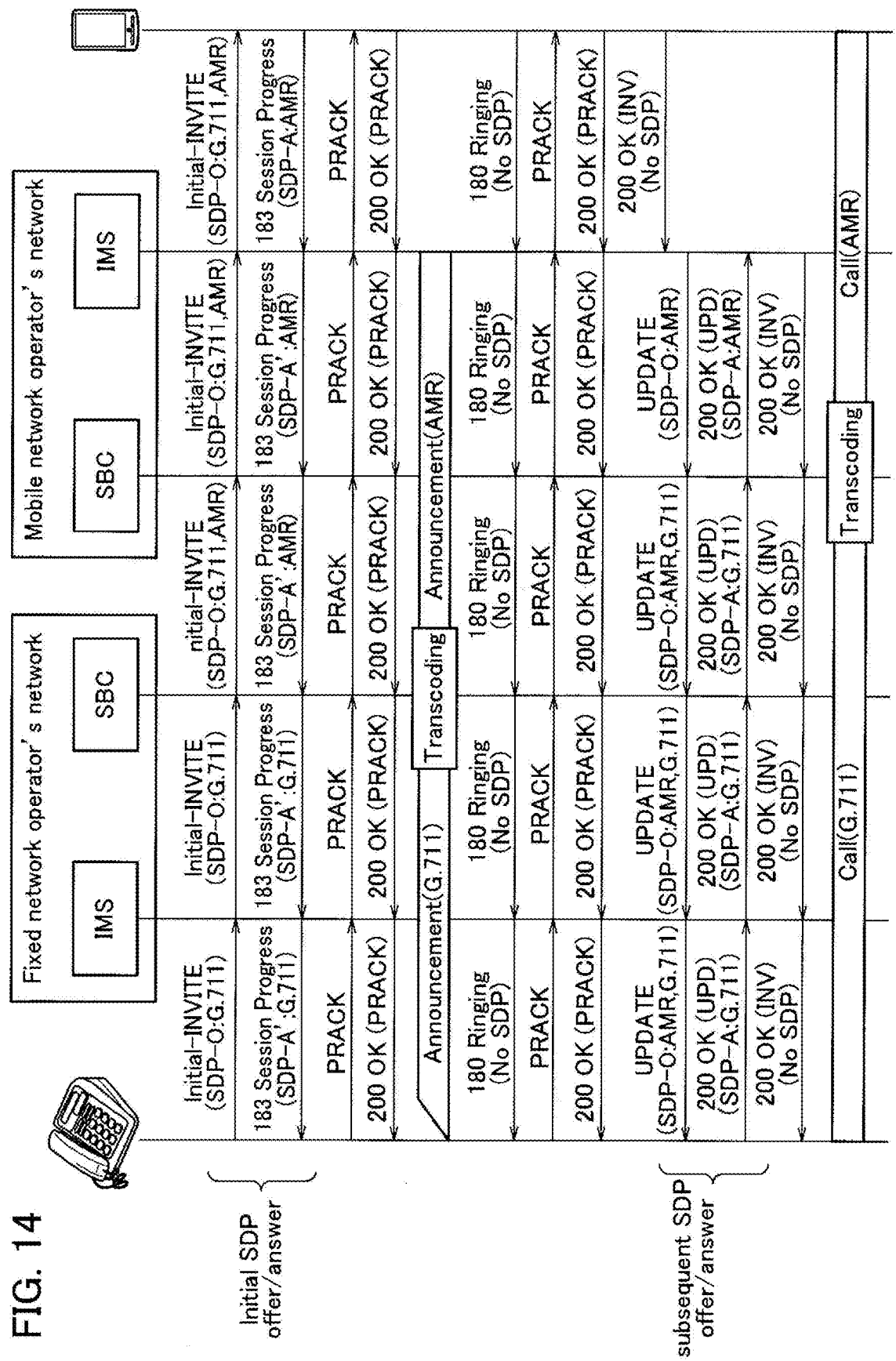
FIG. 14 is a diagram that illustrates a processing procedure of a case where the transcoding is determined to be sequentially executed in the SDP offer transmitting side and the SDP answer transmitting side (specific example for the case of interconnecting the fixed terminal and the mobile terminal).
Figure 15:
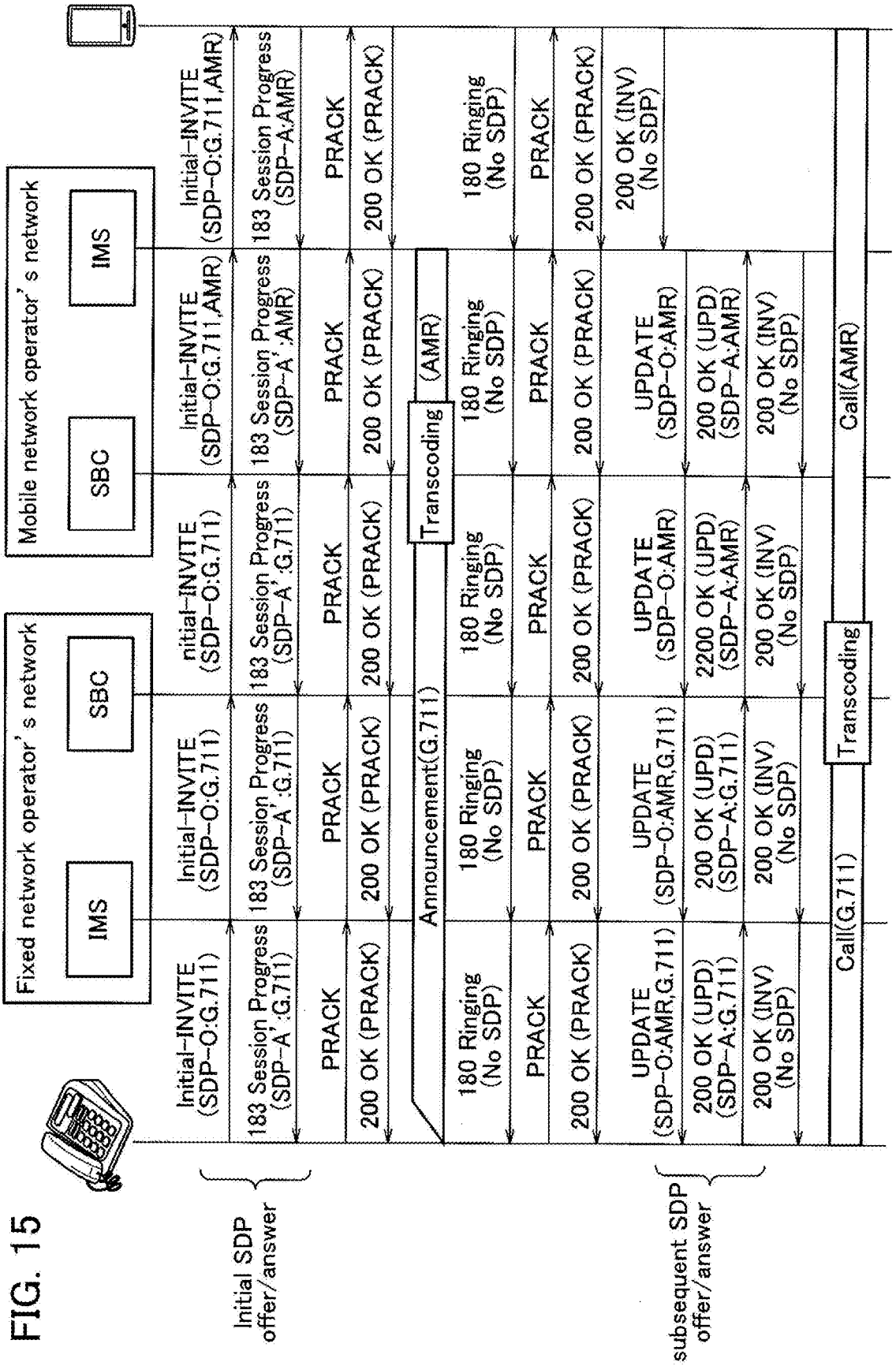
FIG. 15 is a diagram that illustrates a processing procedure of a case where the transcoding is determined to be sequentially executed in the SDP answer transmitting side and the SDP offer transmitting side (specific example for the case of interconnecting the fixed terminal and the mobile terminal).

Next, an operation in a case where transcoding is determined to be executed in the IMS network of initial SDP answer transmitting side (SBC 1*b*) is described with reference to FIG. 6.

First, after the SBC 1*a* receives the initial SDP offer from the own IMS network, if no codec conversion is determined to be executed in the own IMS network, the SBC 1*a* adds no codec into the codec list set in the initial SDP offer and transmits the initial SDP offer to the other IMS network (SBC 1*b*) (step S501).

Next, once the SBC 1*b* receives the initial SDP offer from the SBC 1*a*, when the codec conversion is determined to be executed in the own IMS network, the SBC 1*b* adds the codec that can be transcoded by the own IMS network or a terminal in the own IMS network (codec b) into the codec list set in the initial SDP offer, and transmits the initial SDP offer to the own IMS network (step S502).

Thereafter, the codec that the incoming-side terminal itself in the IMS network of the SBC 1*b* wants to use is selected. Specifically, when the media conditions in the initial SDP offer (codec a, b) includes a media condition that can be used by the incoming-call terminal itself for communication, the incoming-call terminal chooses that media condition (codec b), describes it into the initial SDP answer, and sends back the initial SDP answer.

Next, once the SBC 1*b* receives the initial SDP answer from the own IMS network, since the initial SDP answer does not include the codec included in the previously received SDP offer (codec a) but the previously transmitted codec added by the SBC 1*b* itself (codec b), the SBC 1*b* chooses one codec from the codecs included in the previously received initial SDP offer (only codec a), sets that codec to the initial SDP answer, and transmits the initial SDP answer to the other IMS network (SBC 1*a*) (step S503). At this time, the SBC 1*b* saves information on the received codec (codec b) and information on the transmitted codec (codec a). Particularly, the SBC 1*b* manages the information on the transmitted codec (codec a) as the converted codec information.

Next, once the SBC 1*a* receives the initial SDP answer from the SBC 1*b*, since the initial SDP answer includes the codec included in the previously received SDP offer (codec a), the SBC 1*a* transmits (transparently) the initial SDP answer to the own IMS network (step S504). At this time, the SBC 1*a* saves information on the received codec (codec a) and information on the transmitted codec (codec a). Particularly, the SBC 1*a* manages the information on the transmitted codec (codec a) as the converted codec information.

Thereafter, when the media packet is transmitted from the own IMS network, the SBC 1*b* executes transcoding of "codec b→a" and transmits the media packet to the other IMS network (SBC 1*a*), and when the media packet is transmitted from the other IMS network, the SBC 1*b* executes the transcoding of "codec a→b" and transmits the media packet to the own IMS network (step S505).

Then, a case where the subsequent SDP offer is generated in the IMS network of initial SDP answer transmitting side is described.

Once the SBC 1*b* receives the subsequent SDP offer from the own IMS network, since the subsequent SDP offer does not include the codec selected by the previous SDP negotiation between the SBC 1*b* itself and the opposite IMS network opposing to itself (SBC 1*a*) (the converted codec saved in step S503 (codec a)) and since transcoding is possible between the codec selected by the previous SDP negotiation (codec a) and the codec included in the subsequent SDP offer (codec b), the SBC 1*b* adds the codec selected by the previous SDP negotiation (codec a) and transmits the subsequent SDP offer to the other IMS network (SBC 1*a*) (step S506).

Next, once the SBC 1*a* receives the subsequent SDP offer from the SBC 1*b*, since the subsequent SDP offer includes the codec selected by the previous SDP negotiation between the SBC 1*a* itself and a device in the own IMS network (outgoing-side terminal and the like) (the converted codec saved in step S504 (codec a)), the SBC 1*a* transmits (transparently) the subsequent SDP offer to the own IMS network (step S507).

Next, once the SBC 1*a* receives the subsequent SDP answer from the own IMS network, since the subsequent SDP answer includes the codec included in the previously received SDP offer (codec a), the SBC 1*a* transmits (transparently) the subsequent SDP answer to the other IMS network (SBC 1*b*) (step S508).

Next, once the SBC 1*b* receives the subsequent SDP answer from the SBC 1*a*, since the subsequent SDP answer does not include the codec included in the previously received SDP offer (codec b) but the previously transmitted codec added by the SBC 1*b* itself (codec a), the SBC 1*b* chooses one codec from the codecs included in the previously received SDP offer (only codec b), sets that codec to the subsequent SDP answer, and transmits the subsequent SDP answer to the own IMS network (step S509).

Thereafter, when the media packet is transmitted from the own IMS network, the SBC 1*b* executes transcoding of "codec b→a" and transmits the media packet to the other IMS network (SBC 1*a*), and when the media packet is transmitted from the other IMS network, the SBC 1*b* executes transcoding of "codec a→b" and transmits the media packet to the own IMS network (step S510).

According to this embodiment, since each of the multiple IMS networks (SBC 1*a* and SBC 1*b*) stores the converted codec information selected by the SDP negotiation and executes transcoding of the media data in the own IMS network (SBC 1*a* or SBC 1*b*) when the received SDP does not include the converted codec information, it is possible to fix the IMS network that is determined to execute the transcoding.

Thus, since the execution point and the executor of transcoding which consumes enormous resources can be fixed on the initial SDP offer transmitting side or the initial SDP answer transmitting side, it is possible to predict a resource to be required by the communications carrier and to design equipment, and this facilitates organizing access charges between the communications carriers.

Lastly, the SBC 1*a* and SBC 1*b* described in this embodiment can be implemented by a computer (information processing device) provided with a CPU, a memory, a hard disk, and so on. In addition, it is also possible to create a program for functioning the computer as the SBC 1*a* and SBC 1*b* (call control program) and a storing medium of that program.

At last, Table 3 and Table 4 are further described. In Second Embodiment, as described in the operation description column of "Subsequent" of "SDP offer" in Table 3 or Table 4, the processing of "If the selected codec is not included and also transcoding is possible between the previously negotiated codec and the codec included in the received SDP offer, add the previously negotiated codec" is executed.

As for such a processing, for example, a processing can be considered such as "In the SBC 1*a* determined to execute transcoding, if the SDP offer from the SBC 1*b* does not include the previously selected codec (codec b) and transcoding is possible between the codec selected by the previous negotiation (S401 to S404) (codec a) and the codec included in the received SDP offer (e.g., codec c), add the previously negotiated codec (codec a) to the SDP offer". In this case, the SBC 1*a* keeps a transcodable list in advance for example, and if a codec type of "codec a" and a codec type of "codec c" are being associated with each other in that transcodable list, the SBC 1*a* determines that the transcoding is possible.

In other words, based on Table 3 or Table 4, an SBC 1 (communication device) may also execute a processing such as "If the own communication device is executing transcoding and also receives an SIP message containing the SDP offer not including the previously selected codec (codec b), and if transcoding is possible between the codec included in such an SDP offer (e.g., codec c) and the codec currently in use in the forwarding destination (codec a), add the codec currently in use in the forwarding destination (codec a) into the codec list in the SDP offer".

Note that the transcodable list is an example of a method that enables the SBC 1 to figure out the transcodable codec type.

EXPLANATION OF THE REFERENCE NUMERALS

1 (1*a*, 1*b*) SBC
11 SDP processing unit
12 transcoding unit
13 codec information storing unit

The invention claimed is:

1. A first communication device, comprising:
a memory storing instructions; and
one or more processors configured to execute the instructions to:
when the first communication device is in one of an incoming call side and an outgoing call side,
negotiate, by exchanging an SDP (Session Description Protocol) offer and an SDP answer, an SDP with a second communication device in another of the incoming call side and the outgoing call side as to whether the first communication device or the second communication device performs transcoding of media data;
store a codec type that is determined based on an SDP offer received from the second communication device when negotiating the SDP; and
when transcoding is not performed for media data by the first communication device, and a SIP (Session Initiation Protocol) message containing a subsequent SDP offer is received that includes a same codec type as the codec type from a forwarding source network, forwarding the SIP message to the second communication device without adding any codec type in the subsequent SDP offer.

2. A communication system, comprising:
a first communication device; and
a second communication device,
the first communication device and the second communication device each comprise:
a memory storing instructions; and
one or more processors configured to execute the instructions,
wherein when the first communication device is in one of an incoming call side and an outgoing call side, the first communication device is configured to:
negotiate, by exchanging an SDP (Session Description Protocol) offer and an SDP answer, an SDP with a second communication device in another of the incoming call side and the outgoing call side as to whether the first communication device or the second communication device performs transcoding of media data;
store a codec type that is determined based on an SDP offer received from the second communication device when negotiating the SDP; and
when transcoding is not performed for media data by the first communication device, and a SIP (Session Initiation Protocol) message containing a subsequent SDP offer is received that includes a same codec type as the codec type from a forwarding source network, forwarding the SIP message to the second communication device without adding any codec type in the subsequent SDP offer.

3. A communication method executed between a first communication device and a second communication device, the method comprising:

when the first communication device is in one of an incoming call side and an outgoing call side, the first communication device performs followings, a step of negotiating, by exchanging an SDP (Session Description Protocol) offer an SDP answer, an SDP with a second communication device in another of the incoming call side and the outgoing call side as to whether the first communication device or the second communication device performs transcoding of media data;

a step of storing a codec type that is determined based on a SDP offer received from the second communication device into a codec information storing unit when negotiating the SDP; and a step of forwarding, when transcoding is not performed for media data by the first communication device, and a SIP (Session Initiation Protocol) message containing a subsequent SDP offer is received that includes a same codec type as the codec type from a forwarding source network, the SIP message to the second communication device without adding any codec type in the subsequent SDP offer.

* * * * *